(12) United States Patent
Li

(10) Patent No.: US 10,673,477 B2
(45) Date of Patent: Jun. 2, 2020

(54) COMMUNICATION DEVICE, ADAPTER DEVICE, COMMUNICATION SYSTEM

(71) Applicant: TENDYRON CORPORATION, Beijing (CN)

(72) Inventor: Dongsheng Li, Beijing (CN)

(73) Assignee: TENDYRON CORPORATION, Beijing (CN)

( * ) Notice: Subject to any disclaimer, the term of this patent is extended or adjusted under 35 U.S.C. 154(b) by 0 days.

(21) Appl. No.: 15/769,903

(22) PCT Filed: Oct. 21, 2016

(86) PCT No.: PCT/CN2016/102961
§ 371 (c)(1),
(2) Date: Apr. 20, 2018

(87) PCT Pub. No.: WO2017/067514
PCT Pub. Date: Apr. 27, 2017

(65) Prior Publication Data
US 2018/0316373 A1 Nov. 1, 2018

(30) Foreign Application Priority Data

Oct. 21, 2015 (CN) .......................... 2015 1 0685614
Oct. 21, 2015 (CN) .......................... 2015 1 0685988

(51) Int. Cl.
*H04B 1/16* (2006.01)
*H04B 3/54* (2006.01)
(Continued)

(52) U.S. Cl.
CPC ........... *H04B 1/1607* (2013.01); *H04B 3/542* (2013.01); *H04B 3/548* (2013.01); *H04L 12/10* (2013.01);
(Continued)

(58) Field of Classification Search
CPC ...... H04B 1/1607; H04B 3/542; H04B 3/548; H04B 2001/6904; H04B 2001/6908; H04L 25/4902; H04L 12/40045; H04L 12/10
See application file for complete search history.

(56) References Cited

U.S. PATENT DOCUMENTS 5,357,525 A * 10/1994 Moriue ................. H04L 1/1803
370/360
5,553,070 A * 9/1996 Riley .................... G05B 19/042
327/365

(Continued)

FOREIGN PATENT DOCUMENTS

CN 2722486 Y 8/2005
CN 101271065 A 9/2008
(Continued)

OTHER PUBLICATIONS

International Patent Application No. PCT/CN2016/102961; Int'l Search Report; dated Jan. 26, 2017; 2 pages.

*Primary Examiner* — James M Perez
(74) *Attorney, Agent, or Firm* — BakerHostetler

(57) ABSTRACT

A communication device, an adapter device and a communication system (100) are provided. The system (100) includes: a master communication device (10) and a slave communication device (20), the master communication device (10) includes: a first external interface (130) including a first pin (131) and a second pin (132), and a signal generating module (110) electrically connected to the first pin (131); the signal generating module (110) is configured to generate X signals according to time interval corresponding to an N-bit string to be sent, in which the time interval corresponding to the N-bit string to be sent represents time interval between start times of each two adjacent signals, different time intervals corresponding to different bit strings, (Continued)

where N≥1, X≥1 and X is a natural number; said first external interface (130) is congured to send said X signals through the first pin (131).

17 Claims, 14 Drawing Sheets

(51) Int. Cl.
  *H04L 25/49* (2006.01)
  *H04L 12/40* (2006.01)
  *H04L 12/10* (2006.01)

(52) U.S. Cl.
  CPC .... *H04L 12/40045* (2013.01); *H04L 25/4902* (2013.01)

(56) References Cited

U.S. PATENT DOCUMENTS

| | | | | |
|---|---|---|---|---|
| 5,631,854 A * | 5/1997 | Riley | G05B 19/042 | 370/503 |
| 5,684,343 A * | 11/1997 | Riley | G05B 19/042 | 307/127 |
| 5,691,659 A * | 11/1997 | Riley | G05B 19/042 | 327/143 |
| 5,726,988 A * | 3/1998 | Riley | G05B 19/042 | 340/3.21 |
| 5,764,647 A * | 6/1998 | Riley | G05B 19/042 | 340/12.18 |
| 5,815,493 A * | 9/1998 | Riley | G05B 19/042 | 370/242 |
| 5,852,611 A * | 12/1998 | Riley | G05B 19/042 | 370/498 |
| 5,870,401 A * | 2/1999 | Riley | G05B 19/042 | 327/143 |
| 6,064,697 A * | 5/2000 | Yoshikawa | H03M 5/145 | 375/242 |
| 6,072,783 A * | 6/2000 | Riley | G05B 19/042 | 340/4.3 |
| 6,138,173 A * | 10/2000 | Hisano | G06F 13/385 | 710/13 |
| 6,539,061 B1 * | 3/2003 | Easwar | H04B 14/066 | 375/241 |
| 6,763,057 B1 * | 7/2004 | Fullerton | H04B 1/7176 | 370/322 |
| 7,443,911 B2 * | 10/2008 | Tadayyon | H04L 12/2801 | 348/E5.003 |
| 9,287,902 B2 * | 3/2016 | Li | H04L 25/4902 | |
| 9,565,036 B2 * | 2/2017 | Zerbe | H04L 25/0264 | |
| 9,571,160 B2 * | 2/2017 | Galy | H04L 25/4917 | |
| 9,864,421 B2 * | 1/2018 | Li | G06F 13/4022 | |
| 9,941,999 B1 * | 4/2018 | Milesi | H04L 25/08 | |
| 9,997,939 B2 * | 6/2018 | Li | H02M 7/003 | |
| 10,122,392 B2 * | 11/2018 | Paraschou | H04B 1/0475 | |
| 10,212,009 B2 * | 2/2019 | Qu | H04L 27/04 | |
| 10,243,401 B2 * | 3/2019 | Li | H04M 19/08 | |
| 2001/0033576 A1 * | 10/2001 | Richards | H04L 25/03834 | 370/442 |
| 2001/0053175 A1 * | 12/2001 | Hoctor | H04L 25/4902 | 375/130 |
| 2002/0018514 A1 * | 2/2002 | Haynes | H04B 1/7183 | 375/130 |
| 2002/0034191 A1 * | 3/2002 | Shattil | H04L 1/04 | 370/464 |
| 2002/0071509 A1 * | 6/2002 | Richards | G01S 7/282 | 375/355 |
| 2002/0075972 A1 * | 6/2002 | Richards | H04B 1/0003 | 375/324 |
| 2004/0174924 A1 * | 9/2004 | Lakkis | H04B 1/7174 | 375/130 |
| 2005/0100079 A1 * | 5/2005 | Sanada | H04B 1/7183 | 375/141 |
| 2005/0162338 A1 * | 7/2005 | Ikeda | G09G 5/006 | 345/2.1 |
| 2006/0018369 A1 * | 1/2006 | Sanada | H04B 1/7095 | 375/149 |
| 2006/0039447 A1 * | 2/2006 | Sahinoglu | H04B 1/71632 | 375/130 |
| 2006/0078041 A1 * | 4/2006 | Uchiyama | H04B 1/707 | 375/146 |
| 2010/0275085 A1 * | 10/2010 | Venkatachalam | H04L 1/1835 | 714/748 |
| 2013/0173836 A1 * | 7/2013 | Li | G06F 13/385 | 710/311 |
| 2014/0198928 A1 * | 7/2014 | Li | H04R 3/00 | 381/74 |
| 2014/0219388 A1 * | 8/2014 | Li | H04L 25/4902 | 375/295 |
| 2014/0226697 A1 * | 8/2014 | Maher | H04L 12/40006 | 375/211 |
| 2014/0226839 A1 * | 8/2014 | Li | H03F 3/181 | 381/120 |
| 2014/0241541 A1 * | 8/2014 | Li | H04R 3/12 | 381/74 |
| 2016/0049992 A1 * | 2/2016 | Galy | H03M 9/00 | 375/257 |
| 2016/0202743 A1 * | 7/2016 | Li | H02M 1/10 | 710/313 |
| 2016/0235301 A1 * | 8/2016 | Melodia | G08C 23/02 | |
| 2018/0054087 A1 * | 2/2018 | Li | H04M 19/08 | |
| 2018/0097385 A1 * | 4/2018 | Li | G06F 1/266 | |
| 2018/0331791 A1 * | 11/2018 | Li | H04L 1/18 | |

FOREIGN PATENT DOCUMENTS

| | | |
|---|---|---|
| CN | 101276488 A | 10/2008 |
| CN | 204029102 U | 12/2014 |

* cited by examiner

COMMUNICATION DEVICE, ADAPTER DEVICE, COMMUNICATION SYSTEM

CROSS-REFERENCE TO RELATED APPLICATION

This application is a U.S. National phase application of an International Application No. PCT/CN2016/102961, filed on Oct. 21, 2016, which claims priority to and benefits of Chinese Patent Application Serial No. 201510685988.4 and Chinese Patent Application Serial No. 201510685614.2, filed with the State Intellectual Property Office of P. R. China on Oct. 21, 2015, the entire content of which is incorporated herein by reference.

FIELD

The present disclosure relates to an electric technology field, and more particularly to a communication device, an adapter device, a communication system, a signal generation device and a communication device.

BACKGROUND

At present, electronic products develop rapidly, with various external interfaces. For a product having a main chip, there are generally external interfaces for charging and communication. However, for a typical electronic product, the charging interface and the communication interface are separated, that is, the communication and the charging are performed by using different signal lines respectively. For this, at least three or more lines are needed and a lot of hardware support is needed, thus wasting resources. Further, most electronic products do not support inverse plugging function. With the continuous improvement of comfort of the products, an interface communication convenient for the user and without limiting inserting direction becomes more and more important. However, if two-line communication is used, how to realize data sending of an electronic product using the two-line communication becomes an urgent problem to be solved for those skilled in the art.

SUMMARY

The present disclosure seeks to solve at least one of the above problems.

An objective of the present disclosure is to provide a communication device.

Another objective of the present disclosure is to provide an adapter device.

Another objective of the present disclosure is to provide a communication system.

To achieve the above objectives, technical solutions of the present disclosure are implemented as follows.

The present disclosure provides in a first aspect a communication device including: a first external interface including a first pin and a second pin, and a signal generation module electrically connected to the first pin; in which, the signal generation module is configured to generate X signals according to time interval corresponding to an N-bit string to be sent, the time interval corresponding to the N-bit string to be sent represents time interval between start times of each two adjacent signals, different bit strings correspond respectively to different time intervals, where N≥1, X≥1, and X is a natural number; the first external interface is configured to send the X signals via the first pin.

The present disclosure provides in a second aspect an adapter device including: a communication device as described in the first aspect, a second external interface and a codec, in which the codec is electrically connected between the second external interface and the signal generation module of the communication device, the second external interface is configured to receive first data sent from an external terminal electrically connected to the second external interface; the codec is configured to decode the first data according to a protocol supported by the second external interface, to obtain an N-bit string to be sent, and to send the N-bit string to be sent to the signal generation module.

The present disclosure provides in a third aspect a communication device including: a third external interface including a third pin and a fourth pin, and a signal receiving module electrically connected to the third pin; in which, the third external interface is configured to receive W signals via the third pin, the signal receiving module is configured to detect the W signals received by the third pin, and to obtain a bit string corresponding to each continuous L time intervals in W−1 time intervals of the W signals according to a bit string corresponding to a single time interval in the continuous L time intervals in the W−1 time intervals, in a case of L>1, respective time intervals of the L time intervals are the same, where W and L are positive integers, and L≤W−1.

The present disclosure provides a communication system including a master communication device and a slave communication device, in which the master communication device includes a communication device as described in the first aspect, the slave communication device includes a communication device as described in the third aspect, the third external interface of the slave communication device is connected to the first external interface of the master communication device.

BRIEF DESCRIPTION OF THE DRAWINGS

In order to explicitly illustrate technical solutions in embodiments of the present disclosure, a brief introduction for the accompanying drawings used when describing the embodiments will be listed as follows. Apparently, the drawings described below are only corresponding to some embodiments of the present disclosure, and those skilled in the art may obtain other drawings according to these drawings without creative labor.

FIG. 6A-FIG. 6B are block diagrams illustrating a master communication device as an adapter device according to embodiment 1 of the present disclosure.

DETAILED DESCRIPTION

Figure 1:
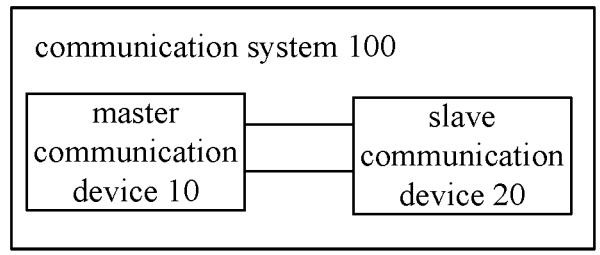
FIG. 1 is a block diagram illustrating a communication system according to embodiment 1 of the present disclosure.

In order to explicitly illustrate technical solutions in embodiments of the present disclosure, the technical solutions in the embodiments of the present disclosure will be described clearly and completely in connection with the drawings in the embodiments of the present disclosure as follows. Apparently, the described embodiments are only part of embodiments of the present disclosure, instead of the entire embodiments. Based on embodiments described herein, those skilled in the art may obtain all other embodiments without creative labor, which belongs to the protection scope of the present disclosure.

In the description of the present disclosure, it should be understood that, terms such as "central", "longitudinal", "lateral", "front", "rear", "right", "left", "horizontal", "vertical", "top", "bottom", "inner", "outer" should be construed to refer to the orientation as then described or as shown in the drawings under discussion. These relative terms are for convenience of description and do not require that the present disclosure be constructed or operated in a particular orientation. In addition, terms such as "first" and "second" are used herein for purposes of description and are not intended to indicate or imply relative importance or significance or to imply the number of indicated technical features.

In the description of the present disclosure, it should be understood that, unless specified or limited otherwise, the terms "mounted", "connected", "coupled", are used broadly, and may be, for example, fixed connections, detachable connections, or integral connections; may also be mechanical or electrical connections; may also be direct connections or indirect connections via intervening structures; may also be inner communications of two elements, which can be understood by those skilled in the art according to specific situations.

Embodiments of the present disclosure will be further described in detail with reference to drawings below.

Embodiment 1

This embodiment provides a communication system.

FIG. 1 is a block diagram illustrating a communication system according to an embodiment of the present disclosure. As illustrated in FIG. 1, the communication system 100 includes a master communication device 10 and a slave communication device 20. A third external interface of the slave communication device 20 is connected to a first external interface of the master communication device 10. The third external interface of the slave communication device 20 consists of two pins. The first external interface of the master communication device 10 also consists of two pins. The master communication device 10 and the slave communication device 20 realize data communication via respective two pins.

Figure 2:
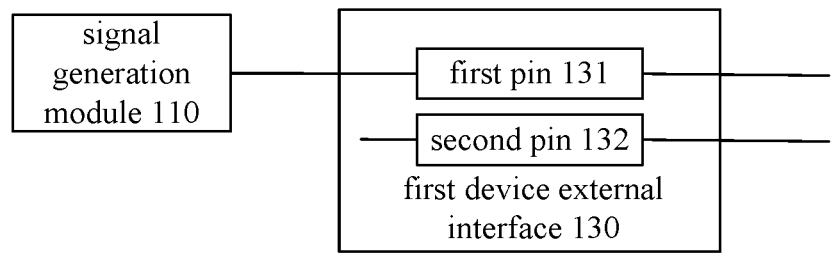
FIG. 2 is a block diagram illustrating a master communication device according to embodiment 1 of the present disclosure.

FIG. 2 is a block diagram illustrating a master communication device 10 according to an embodiment of the present disclosure. As illustrated in FIG. 2, the master communication device 10 includes a signal generation module 110 and a first external interface 130. The first external interface 130 consists of a first pin 131 and a second pin 132. The signal generation module 110 is electrically connected to the first pin 131. The signal generation module 110 is configured to generate X signals according to time interval corresponding to an N-bit string to be sent. The time interval corresponding to the N-bit string to be sent represents time interval between start times of each two adjacent signals of the X signals. Different bit strings correspond to different time intervals respectively. $N≥1$, $X≥1$, and X is a natural number. The first external interface 130 is configured to send the X signals via the first pin 131.

As an alternative implementation of this embodiment of the present disclosure, the signal generation module 110 may obtain a correspondence relationship between time interval and each one of $2^N$ N-bit strings. The $2^N$ bit strings are different from each other, and different bit strings correspond to different time intervals respectively, where $N≥1$. For example, when $N=1$, two 1-bit strings each are bit string 0 and bit string 1. The time interval corresponding to the bit string 0 is T+t1 and the time interval corresponding to the bit string 1 is T+t2, where t1 is not equal to t2. When $N=2$, four 2-bit strings each are bit string 00, bit string 01, bit string 10 and bit string 11, respectively corresponding to time intervals T+t3, T+t4, T+t5, T+t6, in which t3, t4, t5, and t6 are different from each other. When N is equal to 3 or larger than 3, the bit strings can be obtained by referring to the case when $N=2$, which is not elaborated herein. After that, the N-bit string to be sent can be obtained, and then the time interval corresponding to the N-bit string to be sent can be determined according to the correspondence relationship between time interval and each of the N-bit strings.

In an alternative implementation of this embodiment of the present disclosure, the N-bit string (i.e. N-bit data) includes $2^N$ different values. For example, when N=1, 1-bit data includes two different values, which are 0 and 1 respectively. When N=2, 2-bit data includes four different values, which are 00, 01, 10 and 11. Obtaining the correspondence relationship between the time interval and each of $2^N$ N-bit strings may be interpreted as follows. When N=1, the time interval corresponding to bit string 0 is obtained, and the time interval corresponding to bit string 1 is obtained. When N=2, the time interval corresponding to bit string 00 is obtained, the time interval corresponding to bit string 01 is obtained, the time interval corresponding to bit string 10 is obtained, and the time interval corresponding to bit string 11 is obtained. Different bit strings correspond to different time intervals. For example, time intervals respectively corresponding to bit strings 00, 01, 10 and 11 are different from each other. Certainly, when N is other values, the above interpretation is applicative, which is not elaborated herein.

In an alternative implementation of this embodiment of the present disclosure, when the signal generation module 110 generates the X signals, the signal generation module 110 may generate X low level pulses or X high level pulses. The low level pulse or the high level pulse may be denoted by a wave form that can distinguish low and high level pulses, such as a square wave, a sine wave, a triangle wave and the like, which is not limited herein. The slave communication device 20, as a receiving terminal, may determine received bit data according to time intervals of detected low level pulses or detected high level pulses. In this embodiment, the signal generation module 110 generating X low level pulses is taken as an example for description, for a case of the high level pulse, it is similar to that of the low level pulse, such that reference can be made to implementation of the low level pulse.

Thereby, with the master communication device 10 provided in embodiments of the present disclosure, when data is sent, the X signals generated by the signal generation module 110 may make the first pin 131 output X low level pulses or X high level pulses, and then corresponding bit data is sent, thus realizing data sending of the two-line communication device.

Figure 3:
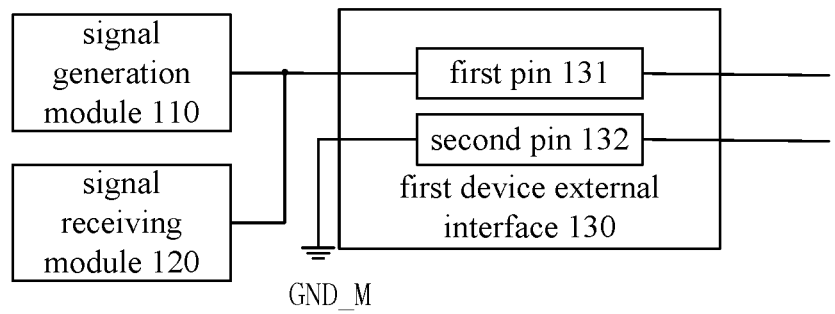
FIG. 3 is a block diagram illustrating a master communication device according to embodiment 1 of the present disclosure.

In an alternative implementation of this embodiment of the present disclosure, as illustrated in FIG. 3, the master communication device 10 further includes a signal receiving module 120 connected to the first external interface 130. The first external interface 130 is further configured to receive Y signals. The signal receiving module 120 is configured to detect the Y signals received by the first external interface 130, and to obtain a bit string transmitted in each continuous L time intervals in Y−1 time intervals of the Y signals according to a bit string corresponding to a single time interval in the continuous L time intervals in the Y−1 time intervals. In a case of L>1, respective time intervals in the L time intervals are the same, where Y and L are positive integers, and L≤Y−1.

In an alternative implementation of this embodiment of the present disclosure, the signal receiving module 120 obtains a value corresponding to a single time interval in each continuous L time intervals in the Y−1 time intervals, to obtain a value corresponding to the continuous L time intervals. The value corresponding to the continuous L time intervals is the value corresponding to the single time interval. The value is one of $2^N$ different values included in the N-bit string, i.e., in a case of L>1, in the Y−1 time intervals, respective time intervals in the continuous L time intervals are the same. A value of the N-bit string corresponding to a single time interval is the value corresponding to the L time intervals. For example, when seven signals are received, six time intervals are obtained, in which there are continuous three same time intervals, it indicates that the sending terminal uses a plurality of same time intervals to represent a value of the N-bit string. The N-bit string corresponding to a single time interval in the three time intervals is obtained. Further, a value corresponding to the three time intervals is obtained. For example, N=2, the bit strings include 0 and 1, and a bit string corresponding to a single time interval is 0, then the value corresponding to the three time intervals is also 0. That is, by a way of repeating a plurality of same time intervals to represent a corresponding bit string, reliability of data receiving and sending is ensured. In a case of L=1, a value transmitted in one time interval is obtained.

In an alternative implementation of this embodiment of the present disclosure, receiving the Y signals by the first external interface 130 may be interpreted as detecting low level pulse for Y times or high level pulse for Y times. The low level pulse and/or the high level pulse may be denoted by a wave form that can distinguish low and high level pulses, such as a square wave, a sine wave, a triangle wave and the like, which is not limited herein.

In this embodiment, one of the two pins (the first pin 131 and the second pin 132) of the first external interface 130 may be electrically connected to the signal receiving module 120 in different implementations. In an alternative implementation of the present disclosure, as illustrated in FIG. 3, the first pin 131 is electrically connected to the signal receiving module 120, and the second pin 132 is connected to a ground end (GND_M). The first pin 131 is further configured to receive the Y signals. In this alternative embodiment, the second pin 132 may detect the low level pulse for Y times.

Figure 4:
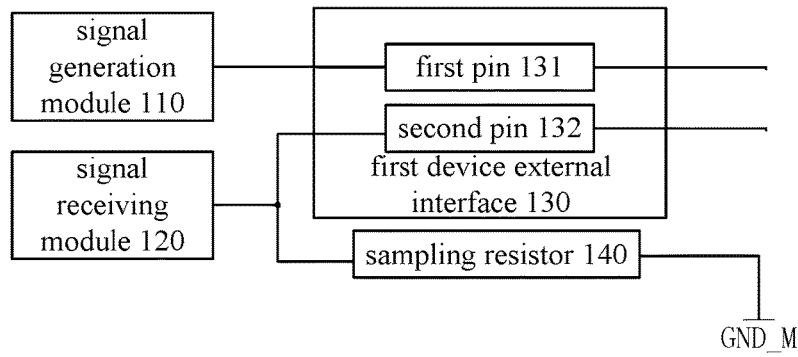
FIG. 4 is a block diagram illustrating a master communication device according to embodiment 1 of the present disclosure.

In another alternative implementation of this embodiment of the present disclosure, as illustrated in FIG. 4, the second pin 132 is electrically connected to the signal receiving module 120, and is configured to receive the Y signals. In this alternative implementation, the second pin 132 can detect the high level pulse for Y times. In this alternative implementation, as illustrated in FIG. 4, the master communication device 10 further includes a sampling resistor 140. One end of the sampling resistor 140 is connected to a connection point (which can also be called as junction) between the second pin 132 and the signal receiving module 120. Another end of the sampling resistor 140 is connected to the ground end (GND_M). Thereby, voltage on the sampling resistor 140 may be obtained according to current passing through the sampling resistor, and then the high/low level may be detected.

As an alternative implementation of embodiments of the present disclosure, the signal receiving module 120 includes a detection module (not illustrated) connected to one end of the sampling resistor 140. The detection module is configured to compare the voltage on the sampling resistor 140 with a reference voltage, and to output a high level or a low level according to a comparison result, such that Y times of high level pulse or Y times of low level pulse may be detected. In this alternative implementation, the detection module may be a comparator, a non-inverting input end (+) of the comparator is connected to one end of the sampling resistor 140, a reference voltage Vref is input into an inverting input end (−) of the comparator, and an output end of the comparator outputs the high level or low level. According to characteristics of the comparator, if input of the non-inverting input end is larger than that of the inverting input end, the high level is output, otherwise, the low level is output. Therefore, the signal receiving module 120 may detect the high level pulse for Y times or the low level pulse for Y times, and the corresponding N-bit string is determined according to time intervals of detected low level pulses or time intervals of detected high level pulses, thus realizing receiving of the bit data.

Figure 5:
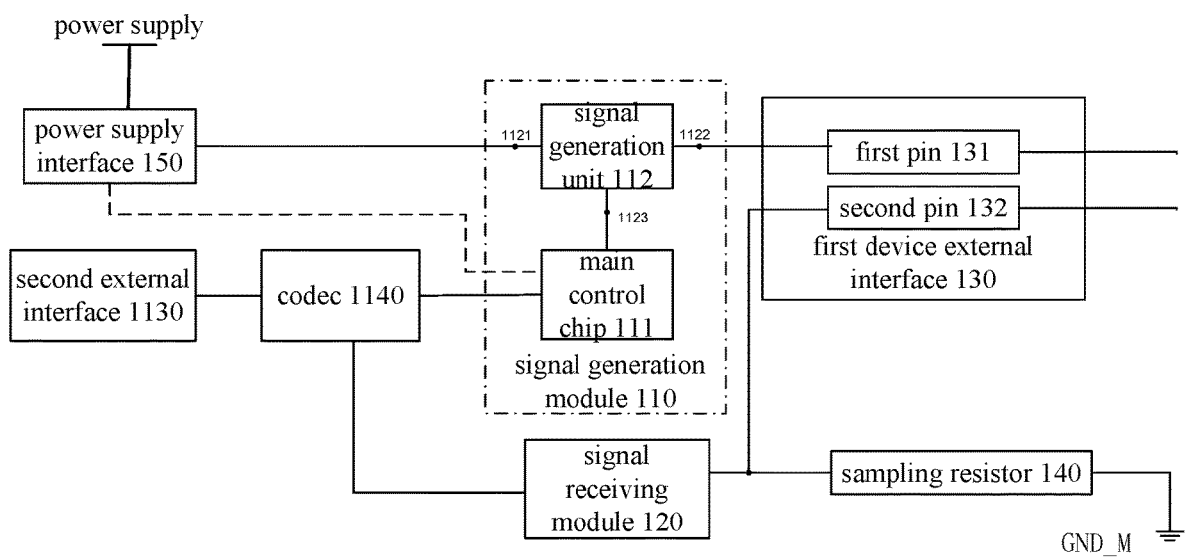
FIG. 5 is a block diagram illustrating a master communication device according to embodiment 1 of the present disclosure.

Base on FIG. 4, as an alternative implementation of this embodiment of the present disclosure, as illustrated in FIG. 5, the master communication device 10 may further include a power supply interface 150 connected to a power supply. The signal generation module 110 is connected between the power supply interface 150 and the first pin 131. Therefore, the power supply may supply power for the slave communication device 20 connected to the first external interface 130. The power supply may be an external power supply of the master communication device 10 or be an internal power supply of the master communication device 10. For example, the power supply may be an internal battery of the master communication device 10, or a continuous high level outputted by a main control chip of the master communication device 10 may be configured as the power supply, which is not limited herein.

In this alternative implementation, as illustrated in FIG. 5, the signal generation module 110 includes a main control chip 111 and a signal generation unit 112.

The main control chip 111 is connected to the signal generation unit 112. The main control chip 111 is configured to generate the X control signals according to the time interval corresponding to the N-bit string to be sent, and to output the X control signals to trigger the signal generation unit 112 to generate the X signals.

The signal generation unit 112 is arranged between the power supply interface 150 and the first pin 131. The signal generation unit 112 is configured to control a connection between the power supply interface 150 and the first pin 131 to be turned on or off under the control of the X control signals output by the main control chip 111, so as to generate the X signals, in which the time interval corresponding to the N-bit string to be sent represents time interval between start times of each two adjacent signals, where X≥1, and X is a natural number.

As an alternative implementation of embodiments of the present disclosure, the signal generation unit 112 includes: a first connection end 1121 electrically connected to the power supply interface 150, a second connection end 1122 electrically connected to the first pin 131, a control end 1123 connected to the main control chip 111. The control end 1123 is configured to control a connection between the first connection end 1121 and the second connection end 1122 to be turned on or off according to the X control signals output by the main control chip 111.

In this alternative implementation, the signal generation unit 112 may be a PMOS transistor. A source (S) electrode of the PMOS transistor is taken as the first connection end 1121 of the signal generation unit 112, a drain (D) electrode of the PMOS transistor is taken as the second connection end 1122 of the signal generation unit 112, and a grid (G) electrode of the PMOS transistor is taken as the control end 1123 of the signal generation unit 112. Certainly, the signal generation unit 112 may also be an NMOS transistor. Connections of respective electrodes of the NMOS transistor may be set with reference to the conduction condition of the NMOS transistor, which are not limited herein.

Figure 6:
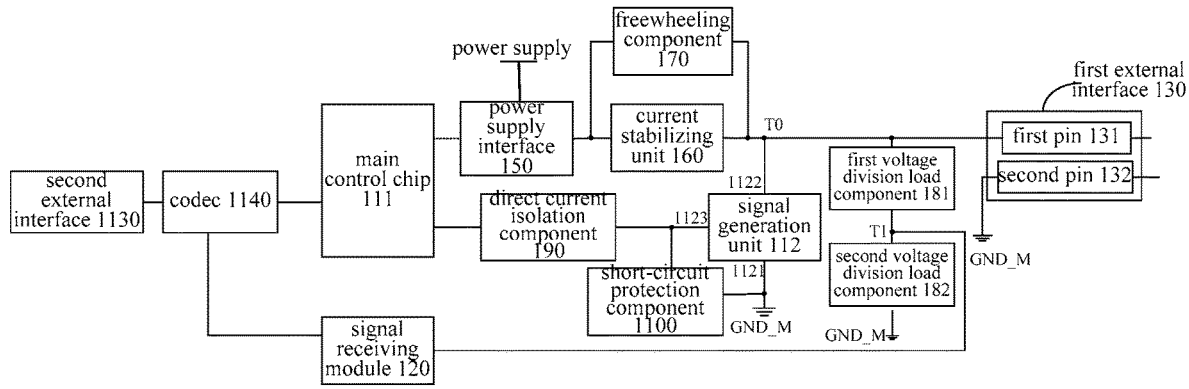
FIG. 6 is a block diagram illustrating a master communication device according to embodiment 1 of the present disclosure.
Figure 6:
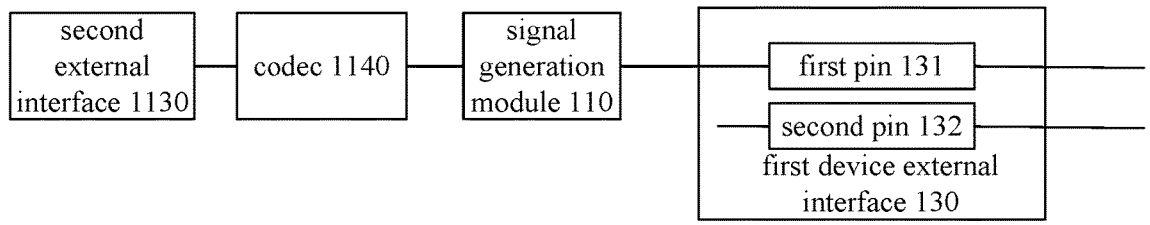
Figure 6:
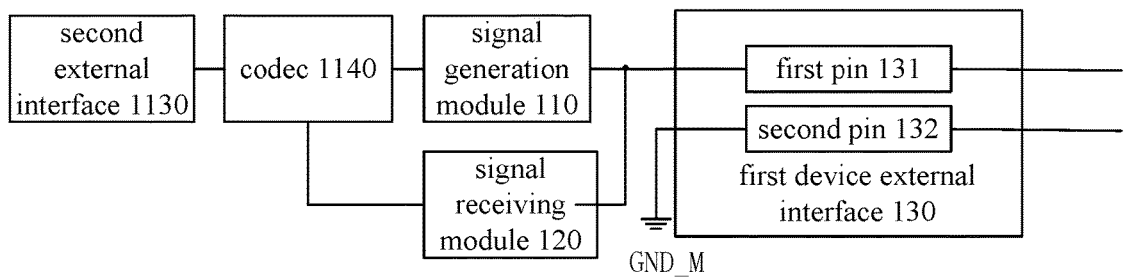
Figure 7A:
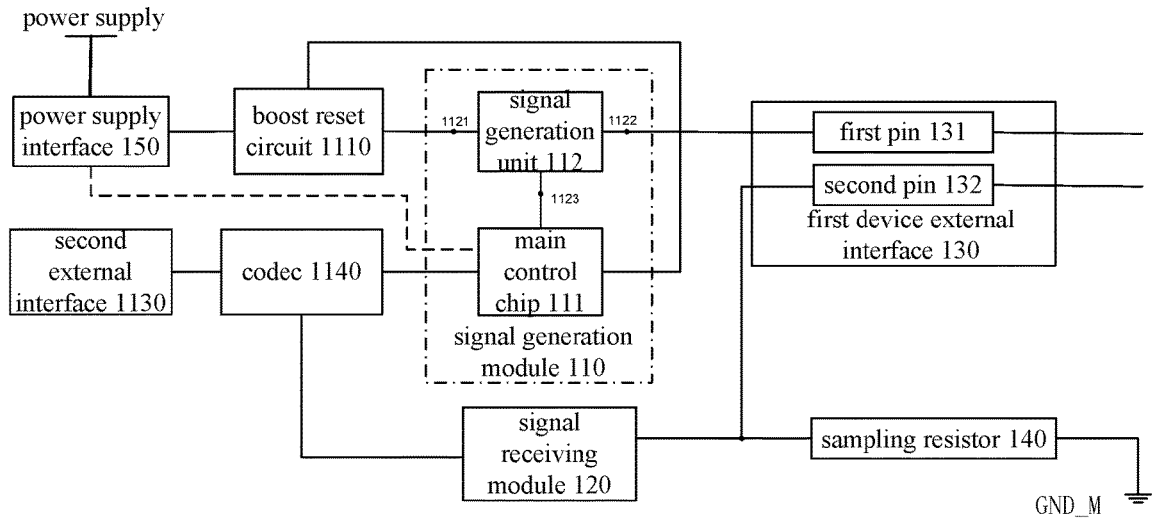
FIG. 7A-FIG. 7B are block diagrams illustrating a master communication device having a boost reset circuit according to embodiment 1 of the present disclosure.
Figure 7B:
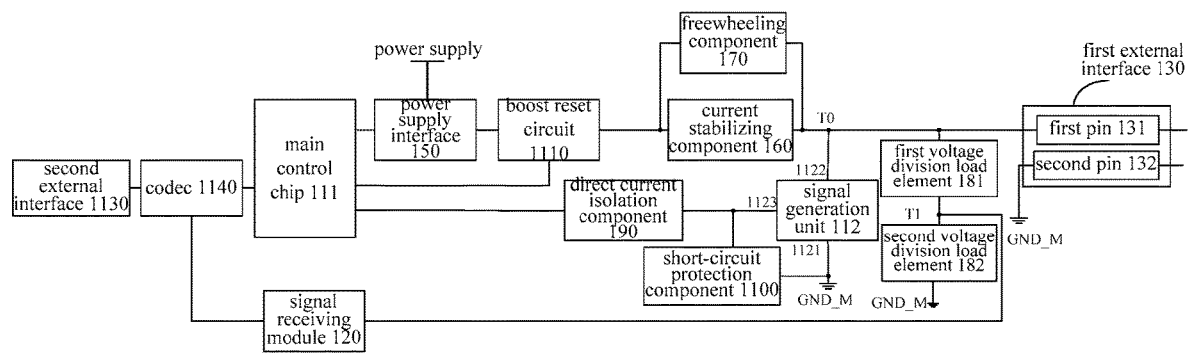
Figure 7C:
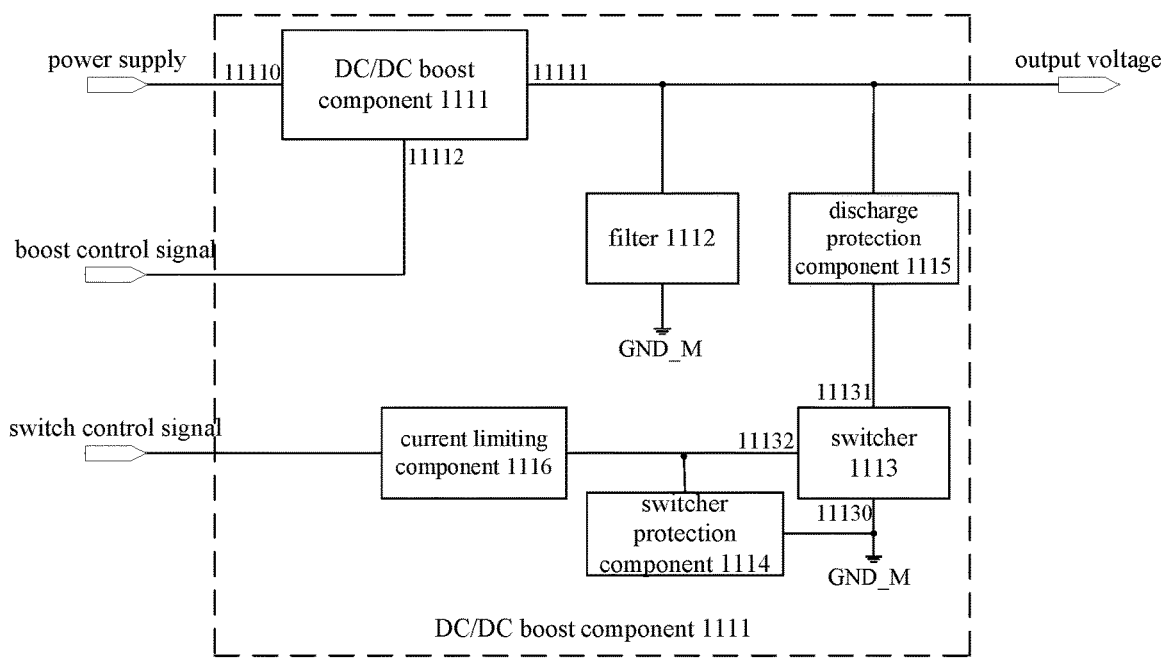
FIG. 7C is a block diagram illustrating a boost reset circuit according to embodiment 1 of the present disclosure.
Figure 7D:
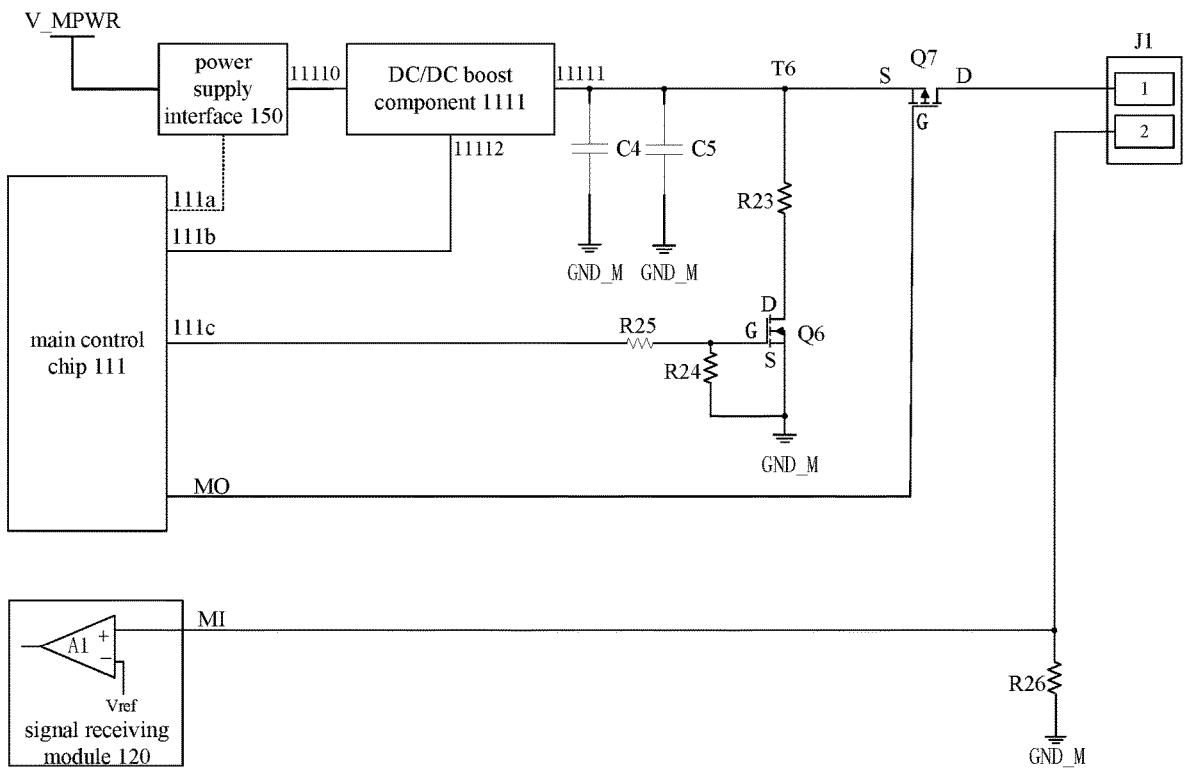
FIG. 7D-FIG. 7E are schematic circuit diagrams illustrating a master communication device 10 having a boost reset circuit according to embodiment 4 of the present disclosure.
Figure 7E:
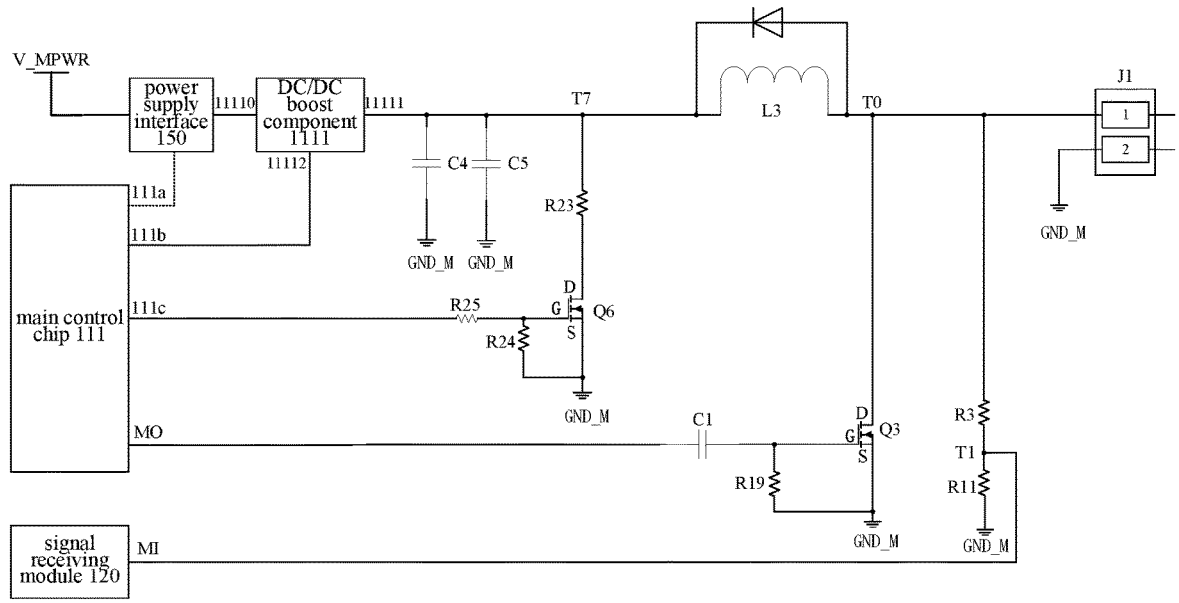
Figure 8A:
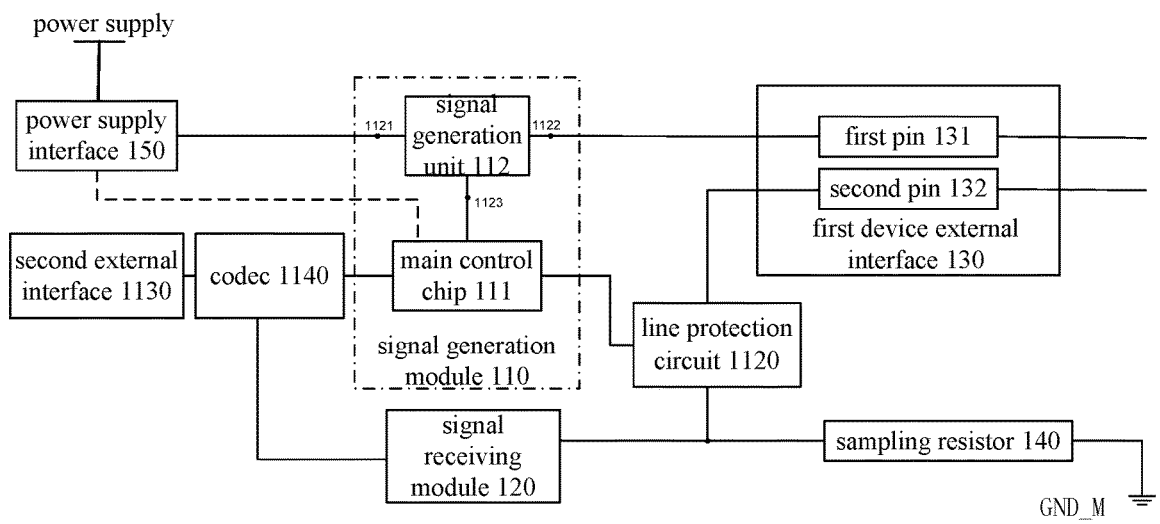
FIG. 8A-FIG. 8B are block diagrams illustrating a master communication device having a line protection circuit according to embodiment 1 of the present disclosure.
Figure 8B:
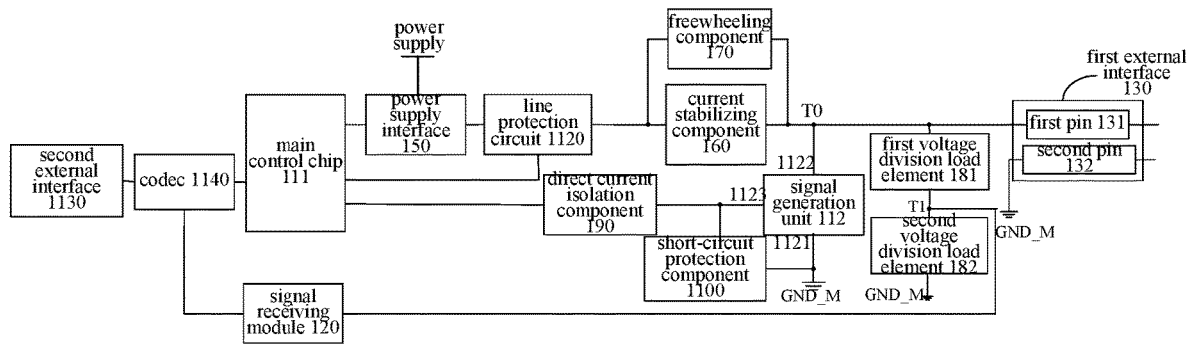
Figure 8C:
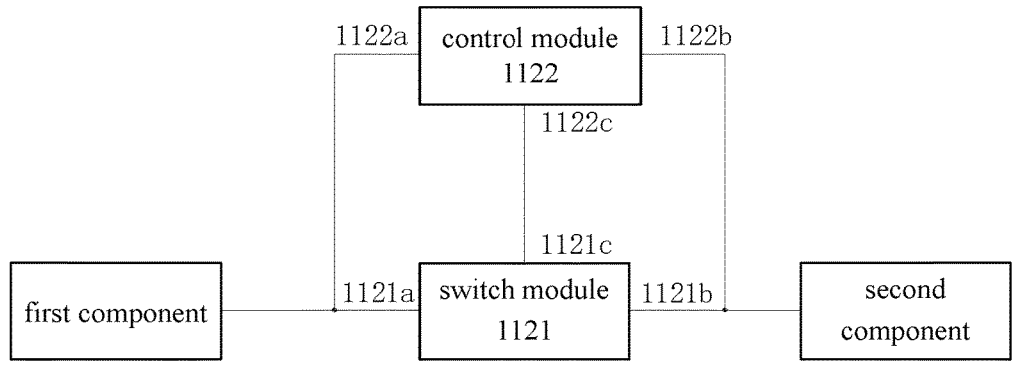
FIG. 8C is a block diagram illustrating a line protection circuit according to embodiment 1 of the present disclosure.
Figure 8D:
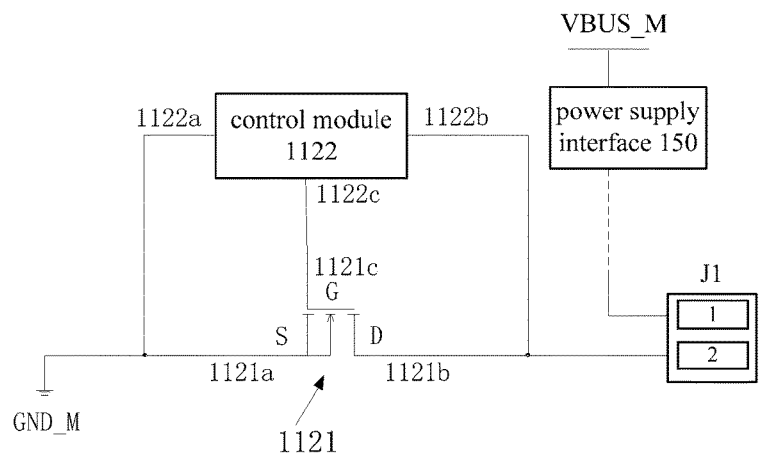
FIG. 8D-FIG. 8E are schematic circuit diagrams illustrating a master communication device 10 having a line protection circuit according to embodiment 5 of the present disclosure.
Figure 8E:
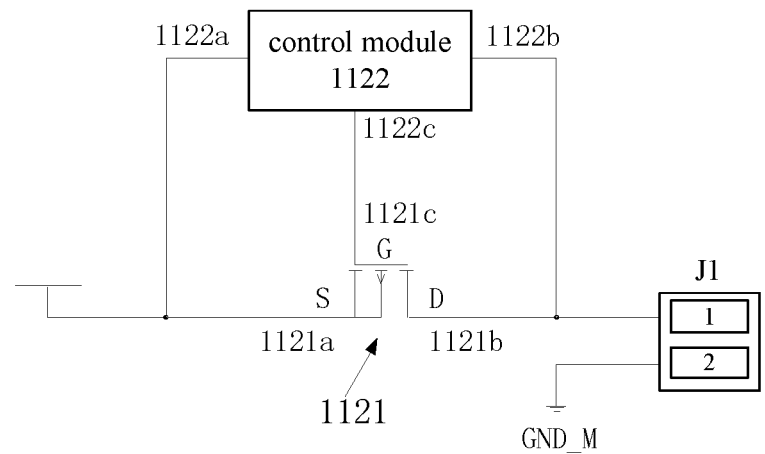

In another alternative implementation of this embodiment of the present disclosure, as illustrated in FIG. 6, the power supply interface 150 is electrically connected to the first pin 131. Therefore, the power supply may supply power for the slave communication device 20 connected to the first external interface 130. The power supply may be an external power supply of the master communication device 10 or be an internal power supply of the master communication device 10. For example, the power supply may be an internal battery of the master communication device 10, or a continuous high level output by a main control chip 111 of the master communication device 10 may be configured as the power supply, which is not limited herein.

In this alternative implementation, the signal generation unit 112 is arranged between the ground end (GND_M) and the first pin 131. A connection between the ground end (GND_M) and the first pin 131 may be controlled to be turned on or off by the X control signals output by the main control chip 111, such that the X signals are generated, in which the time interval corresponding to the N-bit string to be sent represents time interval between start times of each two adjacent signals, where X≥1, and X is a natural number.

As an alternative implementation of embodiments of the present disclosure, the signal generation unit 112 includes: a first connection end 1121 electrically connected to the ground end (GND_M), a second connection end 1122 electrically connected to the first pin 131, and a control end 1123 connected to the main control chip 111. The control end 1123 is configured to control a connection between the first connection end 1121 and the second connection end 1122 to be turned on or off according to the X control signals output by the main control chip 111.

In this alternative implementation, the signal generation unit 112 may be an NMOS transistor. A source (S) electrode of the NMOS transistor is taken as the first connection end 1121 of the signal generation unit 112, a drain (D) electrode of the NMOS transistor is taken as the second connection end 1122 of the signal generation unit 112, and a grid (G) electrode of the NMOS transistor is taken as the control end 1123 of the signal generation unit 112. Certainly, the signal generation unit 112 may also be a PMOS transistor. Connections of respective electrodes of the PMOS transistor may be set with reference to the conduction condition of the PMOS transistor, which are not limited herein.

In another alternative implementation of this embodiment of the present disclosure, as illustrated in FIG. 5 and FIG. 6, the power supply interface 150 may be electrically connected to the main control chip 111 (as denoted by the dotted line). Therefore, the power supply may supply power for the main control chip 111 and the master communication device 10. In addition, the power supply may also supply power for the slave communication device 20 connected to the first external interface 130.

As an alternative implementation of embodiments of the present disclosure, as illustrated in FIG. 6, the master communication device 10 may further include a current stabilizing component 160 connected between the power supply interface 150 and a connection point T0. As illustrated in FIG. 6, the connection point T0 is a junction connecting the signal generation unit 112 and the first pin 131. In a specific embodiment, as an alternative implementation, the current stabilizing component may include an inductor. The current stabilizing component may prevent break-variable of current of the circuit by using characteristics of the inductor. Thus other elements of the master communication device 10 may not be burnt when the signal generation unit 112 is in an on state with regard to the ground.

In addition, as an alternative implementation of embodiments of the present disclosure, as illustrated in FIG. 6, the master communication device 10 may also include a freewheeling component 170. A first end 171 of the freewheeling component 170 is electrically connected to the connection point T0. A second end 172 of the freewheeling component 170 is electrically connected to the power supply interface 150. The freewheeling component 170 may only be conducted from the first end 171 to the second end 172. In a specific embodiment, as an alternative implementation, the freewheeling component 170 may be a diode or other freewheeling elements, which is not limited in this embodiment. Taking the diode as an example, an anode of the diode is taken as the first end 171, and a cathode is taken as the second end 172. That is, the diode may be reversely connected in parallel to both ends of the inductor. When the signal generation unit 112 is switched to an off state from an on state, electromotive force between the two ends of the inductor in the current stabilizing component does not disappear immediately, voltage at the connection point T0 is not stable, and there is oscillation (glitch) at crests or troughs of a wave form. In addition, residual electromotive force may apply reverse voltage to the elements in the circuit, thus damaging the elements. While the diode (a diode having this function is called as the freewheeling diode) reversely connected in parallel to both ends of the inductor may release the residual electromotive force, thus protecting the safety of other elements in the circuit. Further, with the freewheeling component, the oscillation at the fast falling edge can be eliminated (i.e., a smooth waveform is obtained), thus smooth voltage is output (i.e., a high level or a low level).

As an alternative implementation of embodiments of the present disclosure, as illustrated in FIG. 6, the master communication device 10 may further include a first voltage division load component 181 and a second voltage division load component 182. The first voltage division load component 181 and the second voltage division load component 182 are connected in series between the connection point T0 and the ground end. The first voltage division load component 181 is connected between the connection point T0 and the second voltage division load component 182. The signal receiving module 120 is electrically connected to the connection point T0 via the first voltage division load component 181. As an alternative implementation, the first voltage division load component 181 and the second voltage division load component 182 may be resistors or other load components, which are not limited herein.

As illustrated in FIG. 6, the second voltage division load component 182 is connected between the ground end and the first voltage division load component 181. The signal receiving module 120 is connected to a connection point T1 between the first voltage division load component 181 and the second voltage division load component 182, so as to detect voltage at the connection point T1. In a specific embodiment, a supply voltage of the power supply may not be the same as a system detection voltage of the master communication device 10. For example, the supply voltage of the power supply is 5V, while a maximum detection voltage of a detection port can only be 35V. In this case, there is a need to make a maximum voltage input into the detection port be less than or equal to 35V by voltage division, so as to ensure that the detection port and the power supply are level-matched.

As illustrated in FIG. 6, as an alternative implementation of embodiments of the present disclosure, the master communication device 10 may further include a direct current isolation component 190. The direct current isolation component 190 is connected between the main control chip 111 and the signal generation unit 112. As an alternative implementation, the direct current isolation component 190 may be a capacitor or other components that can isolate the direct current, which is not limited herein. A direct current signal may be isolated by the direct current isolation component 190, such that it can prevent the control end of the main control chip 111 from outputting the high level for a long time due to wrong operations or other abnormal cases, thus preventing components from being burnt out caused by long time conducting state of a switch module.

As illustrated in FIG. 6, as an alternative implementation of embodiments of the present disclosure, the master communication device 10 may further include a short-circuit protection component 1100. The short-circuit protection component 1100 is connected in series between the first connection end 1121 and the second connection end of the signal generation unit 112. As an alternative implementation, the short-circuit protection component 1100 may be a resistor or other protection components, which is not limited herein. The short-circuit protection component 1100 can avoid, for example, a situation that the NOMS transistor is turned on due to abnormal charges accumulation at the G electrode of the NMOS transistor.

Figure 15:
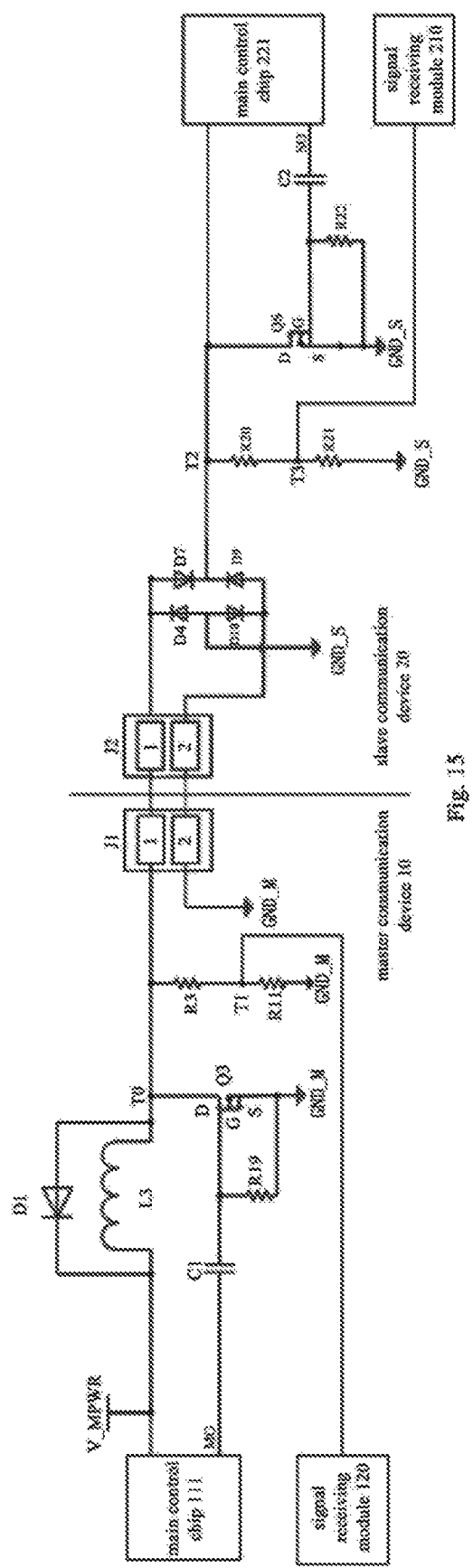
FIG. 15 is a schematic circuit diagram illustrating a communication system according to embodiment 2 of the present disclosure.
Figure 16:
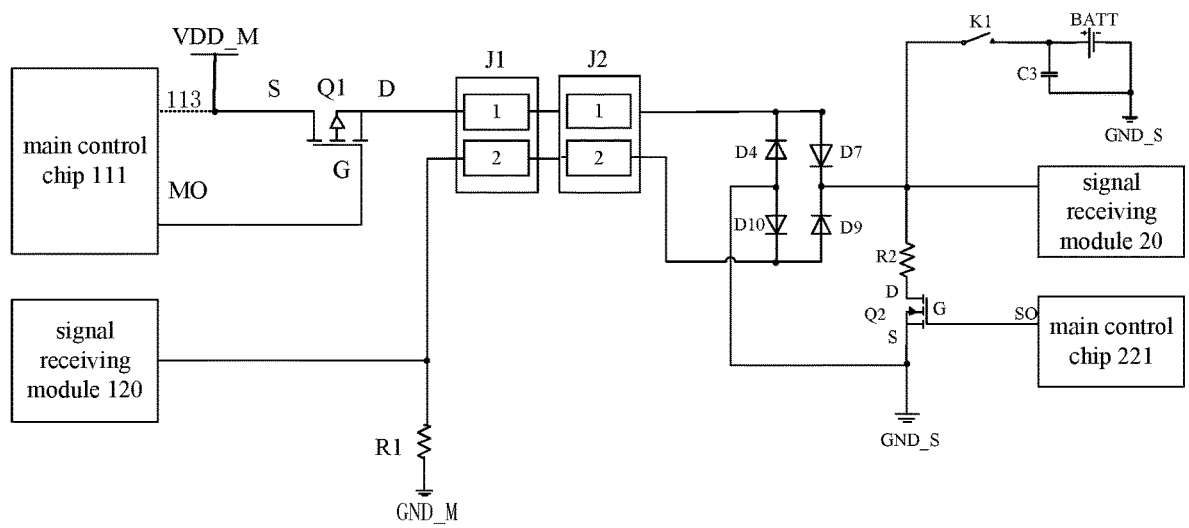
FIG. 16 is a schematic circuit diagram illustrating a communication system according to embodiment 3 of the present disclosure.

In detail, as a specific implementation, in embodiment 2, the master communication device 10 provided by the present disclosure is exemplarily illustrated. FIG. 15 is a schematic circuit diagram illustrating a communication system 100 according to embodiments of the present disclosure. With respect to circuit principle of the master communication device 10, reference may be made to detail description in embodiment 2. As another alternative implementation, in embodiment 3, the communication system 100 provided by the present disclosure is exemplarily illustrated. FIG. 16 is a schematic circuit diagram illustrating a communication system 100 according to embodiments of the present disclosure. With respect to circuit principle of the master communication device 10, reference may be made to detail description in embodiment 3.

As an alternative implementation of embodiments of the present disclosure, the master communication device 10 may further include a boost reset circuit 1110. The boost reset circuit 1110 may be connected between the power supply interface 150 and the first pin 131. Alternatively, the boost reset circuit 1110 may be connected between the power supply interface 150 and power supply. It aims to increase voltage output to the slave communication device 20 from the first pin 131, such that the voltage is high enough to supply power for or charge the slave communication device 20. With respect to possible structures and connections of the boost reset circuit 1110, reference may be made to FIGS. 7A to 7E.

As an alternative implementation of embodiments of the present disclosure, the master communication device 10 may further include a line protection circuit 1120. The line protection circuit 1120 may be connected in series between a first component and a second component. The first component and the second component may have composition forms as follows. The first component is the signal generation module 110, and the second component is the first pin 131. Alternatively, the first component is the power supply interface 150, and the second component is the signal generation module 110. Alternatively, the first component is the power supply interface 150, and the second component is the first pin 131. Alternatively, the first component is the power supply interface 150, and the second component is the current stabilizing component 160 or the freewheeling component 170. Alternatively, the first component is the current stabilizing component 160 or the freewheeling component 170, and the second component is the first pin 131. Alternatively, the first component is the power supply interface 150, and the second component is the boost reset circuit 1110. Alternatively, the first component is the boost reset circuit 1110, and the second component is the current stabilizing component 160 or the freewheeling component 170. Alternatively, the first component is the boost reset circuit 1110, and the second component is the signal generation module 110. Alternatively, the first component is the ground end (GND_M), and the second component is the second pin 132. Alternatively, the first component is the ground end (GND_M), and the second component is a sampling resistor 140. Alternatively, the first component is the sampling resistor 140, and the second component is the second pin 132. With respect to possible structures and connections of the line protection circuit 1120, reference may be made to FIGS. 8A to 8E.

As an alternative implementation of embodiments of the present disclosure, the master communication device 10 may be taken as an adapter device. Based on FIG. 2, the adapter device may further include a second external interface 1130 and a codec 1140. As illustrated in FIG. 6A, one end of the codec 1140 is connected to the second external interface 1130, and the other end of the codec 1140 is connected to the signal generation module 110. The second external interface 1130 is configured to receive first data sent from an external terminal. The codec 1140 is configured to decode the first data according to a protocol supported by the second external interface 1130, to obtain the N-bit string to be sent, and to send the N-bit string to be sent to the signal generation module 110.

In detail, the second external interface 1130 may be a universal interface in the related art, including a wireless interface and a wired interface, such as, a USB interface, an audio interface, a serial port, Bluetooth, WiFi, NFC, and the like. An adapter device may be connected to the external terminal via the second external interface 1130, so as to receive the first data sent from the external terminal. The external terminal may be a mobile phone, a computer, a PAD, and the like. The transport protocol supported by the second external interface 1130 varies depending on interface type of the second external interface 1130. The second external interface 1130 may decode the received first data by using the protocol supported by the second external interface 1130. For example, the second external interface 1130 may decode the first data according to a USB protocol, an audio protocol, a serial port protocol, a Bluetooth protocol, a WiFi protocol, an NFC protocol, and the like, to obtain the bit string corresponding to the first data, i.e. the N-bit string to be sent. By performing data conversion, the second external interface 1130 can convert the data sent from the external terminal into data suitable for transmitting in this embodiment, thus realizing conversion between different interfaces and extending application scope of this embodiment.

As an alternative implementation of this embodiment of the present disclosure, the master communication device 10 may be taken as an adapter device. Different from the embodiment illustrated in FIG. 6A, in this embodiment, after the data is received by the first external interface 130, the data is sent to the codec 1140 for decoding, and then sent out via the second external interface 1130. Based on FIG. 3 and FIG. 6A, the codec 1140 in the adapter device is further connected to the signal receiving module 120, as illustrated in FIG. 6B. The codec 1140 is further configured to receive the bit string transmitted in L time intervals sent by the signal receiving module 120, to encode the bit string transmitted in the L time intervals according to the protocol supported by the second external interface 1130 to obtain second data. The second external interface 1130 is further configured to send the second data to the external terminal.

As an alternative implementation of embodiments of the present disclosure, as illustrated in FIG. 5, FIG. 6, FIG. 7A, FIG. 7B, FIG. 8A, and FIG. 8B, when the master communication device 10 is taken as an adapter device, the adapter device may further include a second external interface 1130 and a codec 1140. One end of the codec 1140 is connected to the second external interface 1130, and the other end of the codec 1140 is connected to the main control chip 111 of the signal generation module 110 and the signal receiving module 120.

When the adapter device receives data from the second external interface 1130, and sends out the data via the first external interface 130, the second external interface 1130 is configured to receive the first data sent from an external terminal. The codec 1140 is configured to decode the first data according to a protocol supported by the second external interface 1130 to obtain the N-bit string to be sent, and to send the N-bit string to be sent to the main control chip 111 of the signal generation module 110.

When the adapter device receives data from the first external interface 130, and sends out the data via the second external interface 1130, the codec 1140 is further configured to receive the bit string corresponding to L time intervals sent by the signal receiving module 120, to encode the bit string corresponding to the L time intervals according to the protocol supported by the second external interface 1130 to obtain second data. The second external interface 1130 is further configured to send the second data to the external terminal.

In the above-mentioned implementations, the second external interface 1130 may be a universal interface in the related art, including a wireless interface and a wired interface, such as, a USB interface, an audio interface, a serial port, Bluetooth, WiFi, NFC, and the like. A data transmission device may be connected to the external terminal via the second external interface 1130, so as to receive the first data sent from the external terminal. The external terminal may be a mobile phone, a computer, a PAD, and the like. The transport protocol supported by the second external interface 1130 varies depending on interface type of the second external interface 1130. The second external interface 1130 may decode the received first data by using the protocol supported by the second external interface 1130. For example, the second external interface 1130 may decode the first data according to a USB protocol, an audio protocol, a serial port protocol, a Bluetooth protocol, a WiFi protocol, an NFC protocol, and the like, to obtain the bit string corresponding to the first data, i.e. the N-bit string to be sent. By performing data conversion, the second external interface 1130 can convert the data sent from the external terminal into data suitable for transmitting in this embodiment, thus realizing conversion between different interfaces and extending application scope of this embodiment.

As an alternative implementation of embodiments of the present disclosure, the master communication device 10 may be a device capable to communicate with the slave communication device 20, such as a PC, a PAD (a tablet computer), a smart phone, a smart wearable device, and the like. Alternatively, the master communication device 10 may be an adapter device controlled by an external terminal. The communication system 100 may further include an external communication terminal. Under the control of the external communication terminal, the master communication device 10 which is taken as the adapter device transmits bit data with the slave communication device 20. In this case, the external communication terminal may be a master control device such as a PC, a PAD (tablet computer), a smart phone, a smart wearable device, and the like. The master communication device 10 is electrically connected to the communication terminal via the second external interface. The codec may perform corresponding transport protocol conversion on the bit data to be sent which is output from the external terminal to the master communication device 10 via the second external interface, and then input it into the main control chip. The main control chip outputs corresponding control signals according to obtained bit data to be sent, so as to control the master communication device 10 to transmit the bit data to be output to the slave communication device 20. At the same time, the main control chip may perform, via the codec, corresponding transport protocol conversion on the bit data received from the slave communication device 20, and then output it to the external communication terminal via the second external interface, thus realizing communication between a non-two-line device and a two-line device.

Thereby, with the master communication device 10 provided in embodiments of the present disclosure, when the data is sent, the level at the connection point T0 may be controlled by the signals generated by the signal generation module 110, such that the level of the first pin 131 changes (such as generating a high level pulse or a low level pulse), and then corresponding bit data is transmitted. When the data is received, the level of the first pin 131 or the second pin 132 may be detected via the signal receiving module 120, the main control chip 111 may obtain corresponding bit data according to the level changes continuously detected by the signal receiving module 120, and two-line communication between the master communication device 10 and the slave communication device 20 can be realized. In addition, the power supply interface 150 may be electrically connected to the first pin 131, the power supply may supply power for the slave communication device 20 connected to the first external interface 130. Thus the master communication device 10 may continuously supply power for the slave communication device 20. Therefore, with this embodiment, it can guarantee that the master communication device can supply power for the slave communication device at the same time when the two-line communication is performed between the master communication device and the slave communication device.

Figure 9:
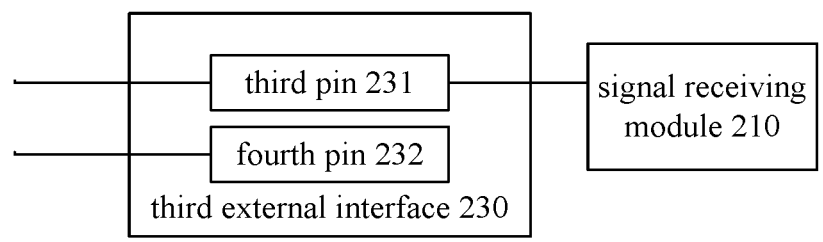
FIG. 9 is a block diagram illustrating a slave communication device according to embodiment 1 of the present disclosure.

FIG. 9 to FIG. 12 are block diagrams illustrating a slave communication device 20 provided in embodiments of the present disclosure. As an alternative implementation of embodiments of the present disclosure, as illustrated in FIG. 9, the slave communication device 20 includes a signal receiving module 210 and a third external interface 230. The third external interface 230 is composed of a third pin 231 and a fourth pin 232. The signal receiving module 210 is electrically connected to the third pin 231 of the third external interface 230. The third external interface 230 is configured to receive W signals via the third pin 231. The signal receiving module 210 is configured to detect the W signals received by the third pin 231, and to obtain a bit string corresponding to each continuous L time intervals in W−1 time intervals of the W signals according to a bit string corresponding to a single time interval in the continuous L time intervals in the W−1 time intervals. In a case of L>1, respective time intervals in the L time intervals are the same, where W and L are positive integers, and L≤W−1.

As an alternative implementation of this embodiment of the present disclosure, the signal receiving module 210 obtains a value corresponding to a single time interval in each continuous L time intervals in the W−1 time intervals, to obtain a value corresponding to the L time intervals. The value corresponding to the L time intervals is the value corresponding to the single time interval. The value is one of $2^N$ different values included in the N-bit string, i.e., in a case of L>1, in the W−1 time intervals, respective time intervals in the continuous L time intervals are the same. A value of the N-bit string corresponding to a single time interval is the value corresponding to the L time intervals. For example, seven signals are received, and six time intervals are obtained, in which, three continuous time intervals are the same, i.e., the sending terminal uses a plurality of same time intervals to represent a value of N-bit data. N-bit data corresponding to a single time interval in the three time intervals is obtained. Further, a value transmitted in the three time intervals is obtained. For example, N=2, the bit strings include 0 and 1, and a bit string corresponding to a single time interval is 0, then the value corresponding to the three time intervals is also 0. That is, by a way of repeating a plurality of same time intervals to represent a corresponding bit string, reliability of data receiving and sending is ensured. In a case of L=1, a value transmitted in one time interval is obtained.

In an alternative implementation of this embodiment of the present disclosure, receiving the W signals by the third external interface 230 may refer to detecting low level pulse for W times or high level pulse for W times. The low level pulse or the high level pulse may be denoted by a wave form that can distinguish the low and high level pulse, such as a square wave, a sine wave, a triangle wave and the like, which is not limited herein.

Thereby, with the slave communication device 20 provided in embodiments of the present disclosure, when the data is received, the signal receiving module 210 may detect the low level pulse for Y times or the high level pulse for Y times, and a corresponding N-bit string is determined according to time intervals of low level pulses or high level pulses, thus realizing receiving of the bit data.

Figure 10:
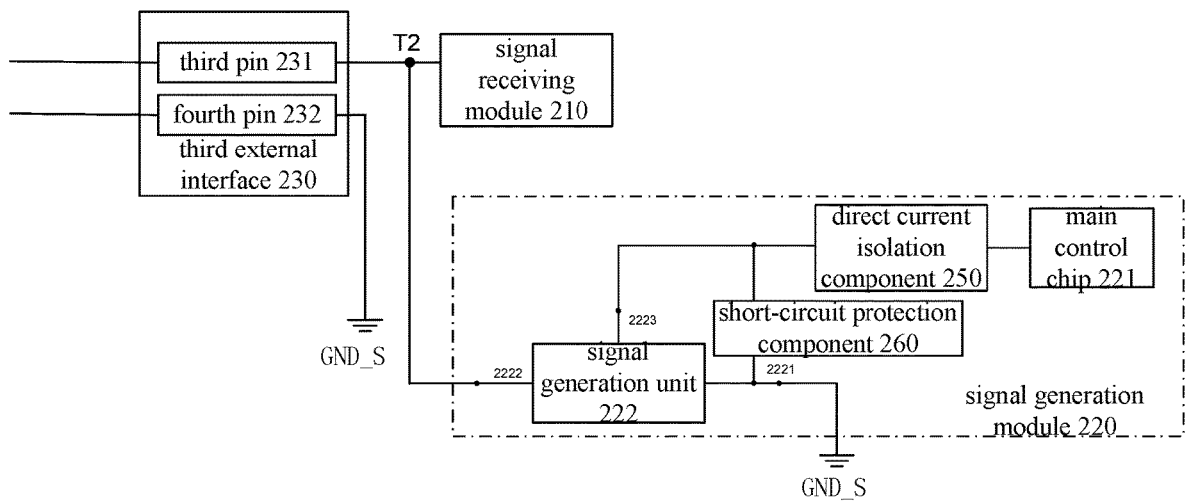
FIG. 10 is a block diagram illustrating a slave communication device according to embodiment 1 of the present disclosure.

In an alternative implementation of this embodiment of the present disclosure, as illustrated in FIG. 10, the slave communication device 20 may further include a signal generation module 220 connected to the third external interface 230. The signal generation module 220 is configured to generate Z signals according to time interval corresponding to the N-bit string to be sent, in which the time interval corresponding to the N-bit string to be sent represents time interval between start times of each two adjacent signals, and different bit strings correspond to different time intervals respectively, where N≥1, Z≥1, and Z is a natural number. The third external interface 230 is further configured to send the Z signals.

As an alternative implementation of this embodiment of the present disclosure, familiar to principle of generating signals by the signal generation module 110 of the master communication device 10 in the embodiment illustrated in FIG. 2, the signal generation module 220 may firstly obtain a correspondence relationship between time interval and each of $2^N$ N-bit strings. The $2^N$ N-bit strings are different from each other, and different bit strings correspond to different time intervals respectively, where N≥1. And then, the signal generation module 220 obtains an N-bit string to be sent, so as to obtain the time interval corresponding to the N-bit string to be sent according to the correspondence relationship between the time interval and each of the N-bit strings.

In an alternative implementation of this embodiment of the present disclosure, when generating Z signals, the signal generation module 220 may generate Z low level pulses or Z high level pulses. The low level pulse or the high level pulse may be denoted by a wave form that can distinguish the low and high level pulse, such as a square wave, a sine wave, a triangle wave and the like, which is not limited herein. As a receiving terminal, the master communication device 10 may determine received bit data according to time intervals of detected low level pulses or detected high level pulses.

Thereby, with the slave communication device 20 provided in embodiments of the present disclosure, when data is sent, the Z signals generated by the signal generation module 220 may make the third pin 231 output Z low level pulses or Z high level pulses, and then corresponding bit data is transmitted, thus realizing data sending of the two-line communication device.

In this embodiment, one of the two pins (i.e., the third pin 231 and the fourth pin 232) of the third external interface 230 may be electrically connected to the signal generation module 220. In an alternative implementation of this embodiment of the present disclosure, as denoted by the solid line illustrated in FIG. 10, the third pin 231 is electrically connected to the signal generation module 220 and the fourth pin 232 is electrically connected to the ground end (GND_S). The third pin 231 is configured to send the Z signals. In this alternative implementation, the fourth pin 232 may output low level pulse for Z times.

In another alternative implementation of this embodiment of the present disclosure, the fourth pin 232 is electrically connected to the signal generation module 220, configured to send the Z signals. In this alternative implementation, the fourth pin 232 may output high level pulse for Z times. Thereby, by this way, the slave communication device 20 in embodiments of the present disclosure may realize data sending by using any pin of the third external interface 230.

In an alternative implementation of this embodiment of the present disclosure, as illustrated in FIG. 10, the signal generation module 220 includes a main control chip 221 and a signal generation unit 222.

The main control chip 221 is electrically connected to the signal generation unit 222, configured to generate the Z control signals according to the time interval corresponding to the N-bit string to be sent, and to output the Z control signals to trigger the signal generation unit 222 to generate Z signals.

The signal generation unit 222 is arranged between a ground end (GND_S) and a first connection point T2. The signal generation unit 222 is configured to control a connection between the ground end (GND_S) and the first connection point T2 to be turned on or off under the control of the Z control signals output by the main control chip 221, so as to generate the Z signals. The first connection point T2 is a junction where the third pin 231 is connected to an input end of the signal generation module 220 and an input end of the signal receiving module 210.

As an alternative implementation of embodiments of the present disclosure, the signal generation unit 222 includes a first connection end 2221, a second connection end 2222 and a control end 2223. The first connection end 2221 is connected to the ground end (GND_S). The second connection end 2222 is connected to the third pin 231. The control end 2223 is connected to the main control chip 221, and configured to control a connection between the first connection end 2221 and the second connection end 2222 to be turned on or off according to the Z signals output by the main control chip 221.

In this alternative implementation, the signal generation unit 222 may be an NMOS transistor. A source (S) electrode of the NMOS transistor is taken as the first connection end 2221 of the signal generation unit 222, a drain (D) electrode of the NMOS transistor is taken as the second connection end 2222 of the signal generation unit 222, and a grid (G) electrode of the NPMOS transistor is taken as the control end 2223 of the signal generation unit 222. Certainly, the signal generation unit 222 may also be a PMOS transistor. Connections of respective electrodes of the PMOS transistor may be set with reference to the conduction condition of the PMOS transistor, which are not limited herein.

As illustrated in FIG. 10, as an alternative implementation of embodiments of the present disclosure, the salve communication device 20 may further include a direct current isolation component 250. The direct current isolation component 250 is connected between the main control chip 221 and the signal generation unit 222. As an alternative implementation, the direct current isolation component 250 may be a capacitor or other components that can isolate the direct current, which is not limited herein. A direct current signal may be isolated by the direct current isolation component 250, such that it can prevent the control end of the main control chip 221 from outputting high level for a long time due to wrong operations or other abnormal cases, thus preventing components from being burnt out caused by long time conducting state of a switch module.

As an alternative implementation of embodiments of the present disclosure, as illustrated in FIG. 10, the slave communication device 20 may further include a short-circuit protection component 260. The short-circuit protection component 260 is connected in series between the first connection end 2221 and the second connection end of the signal generation unit 222. As an alternative implementation, the short-circuit protection component 260 may be a resistor or other protection components, which is not limited herein. The short-circuit protection component 260 can avoid, for example, a situation that the NMOS transistor is turned on due to abnormal charges accumulation at the G electrode of the NMOS transistor.

Figure 11:
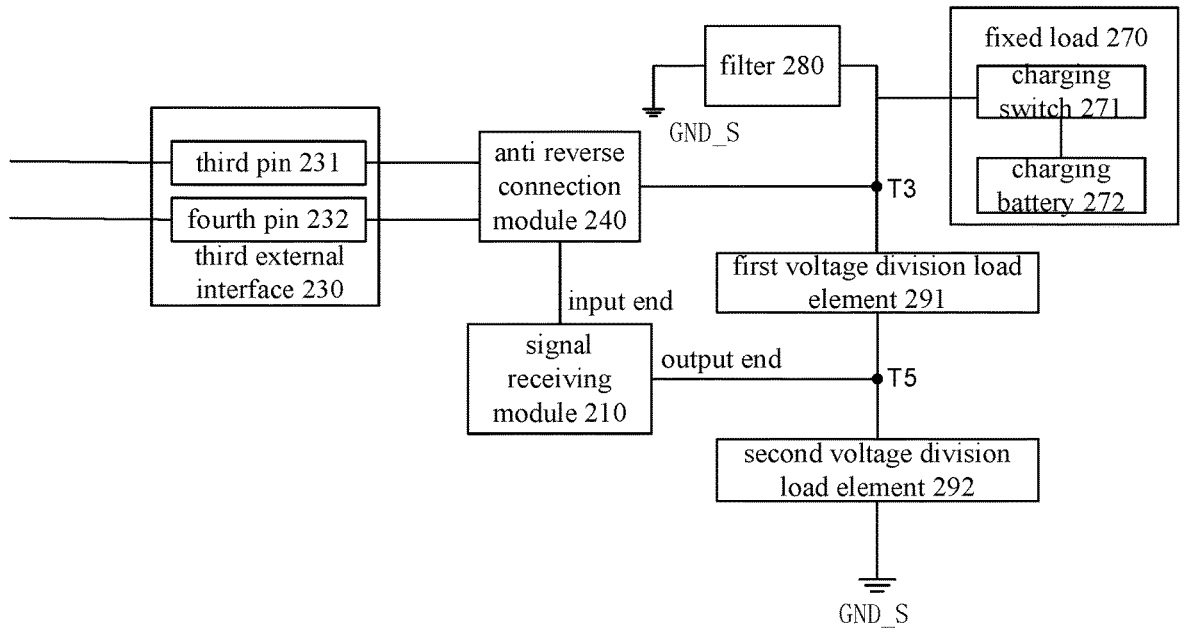
FIG. 11 is a block diagram illustrating a slave communication device according to embodiment 1 of the present disclosure.

In an alternative implementation of this embodiment of the present disclosure, based on FIG. 9, the slave communication device 20 may further include an anti reverse connection module 240. As illustrated in FIG. 11, the anti reverse connection module 240 is electrically connected to the third external interface 230, and electrically connected to an input end and an output end of the signal receiving module 210. The anti reverse connection module 240 is configured to control a first connection between the input end of the signal receiving module 210 and one of the third pin 231 and the fourth pin 232 to be turned on, and to control a second connection between the output end of the signal receiving module 210 and the other one of the third pin 231 and the fourth pin 232 to be turned on. In detail, a current flow direction of the first connection is from the one of the third pin 231 and the fourth pin 232 to the input end of the signal receiving module 210. A current flow direction of the second connection is from the output end of the signal receiving module 210 to the other one of the third pin 231 and the fourth pin 232. The input end of the signal receiving module 210 refers to one end through which the current flows into, and the output end of the signal receiving module 210 refers to one end through which the current flows out.

Figure 12:
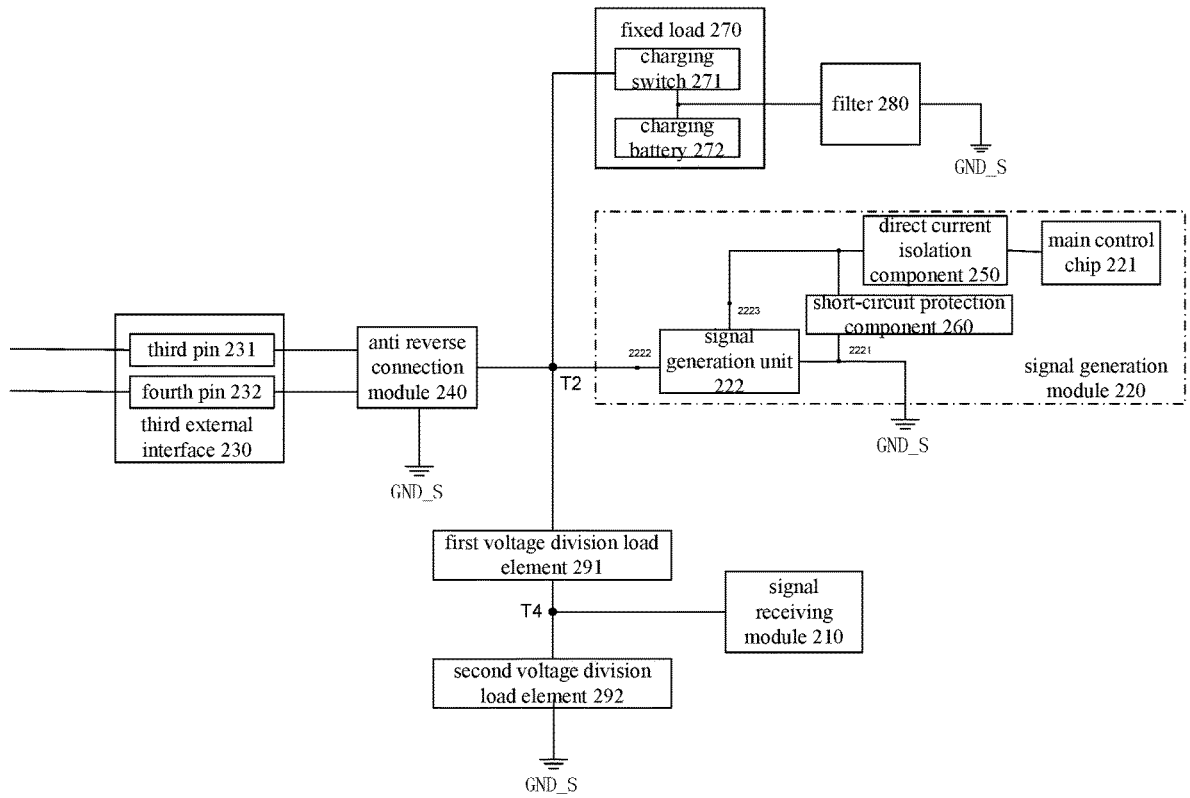
FIG. 12 is a block diagram illustrating a slave communication device according to embodiment 1 of the present disclosure.

In another alternative implementation of this embodiment of the present disclosure, based on FIG. 10, the slave communication device 20 further includes an anti reverse connection module 240. As illustrated in FIG. 12, the anti reverse connection module 240 is electrically connected to the third external interface 230, and electrically connected to an input end of the signal generation module 220 and an input end of the signal receiving module 210 respectively. An output end of the signal generation module 220 is electrically connected to a ground end (GND_S). An output end of the signal receiving module 210 is electrically connected to the ground end (GND_S) via a relatively large load (not illustrated). The anti reverse connection module 240 is connected to the ground end (GND_S). The anti reverse connection module 240 is configured to control a first connection between a first connection point T2 and one of the third pin 231 and the fourth pin 232 to be turned on (i.e., conduct the first connection between a first connection point T2 and one of the third pin 231 and the fourth pin 232), and to control a second connection between the ground end (GND_S) and the other one of the third pin 231 and the fourth pin 232 to be turned on. The first connection point T2 is a junction where the anti reverse connection module 240 is connected to the input end of the signal generation module 220 and the input end of the signal receiving module 210. In detail, a current flow direction of the first connection is from the one of the third pin 231 and the fourth pin 232 to the first connection point T2. A current flow direction of the second connection is from the ground end (GND_S) to the other one of the third pin 231 and the fourth pin 232. Each of the input ends of the signal receiving module 210 and the signal generation module 220 refers to one end through which the current flows into, and each of the outputs end of the signal receiving module 210 and the signal generation module 220 refers to one end through which the current flows out.

In FIG. 10, the signal generation unit 222 of the signal generation module 220 is arranged between the ground end and the first connection point T2. One end, connected to the first connection point T2, of the signal generation unit 222 is the input end of the signal generation module 220, and the other end, connected to the ground end, of the signal generation unit 222 is the output end of the signal generation module 220.

With the anti reverse connection module according to embodiments of the present disclosure, a function of anti reverse connection may be realized. That is, no matter the connections between the two pins of the third external interface 230 of the slave communication device 20 and the two pins of the first external interface 130 of the master communication device 10 are positive connections (i.e., the first pin 131 is connected to the third pin 231, and the second pin 132 is connected to the fourth pin 232) or reverse connections (i.e., the first pin 131 is connected to the fourth pin 232, and the second pin 132 is connected to the third pin 231), the master communication device 10 and the slave communication device 20 can communicate with each other. However, in the related art, only unilateral connection may be realized. For example, they can normally communicate only in the positive connection, while they cannot communicate in the reverse connection. Or, they can normally communicate only in the reverse connection, while they cannot communicate in the positive connection. In embodiments of the present disclosure, no matter the slave communication device is positively or reversely connected to the master communication device, the slave communication device can communicate with the master communicate device.

Figure 13:
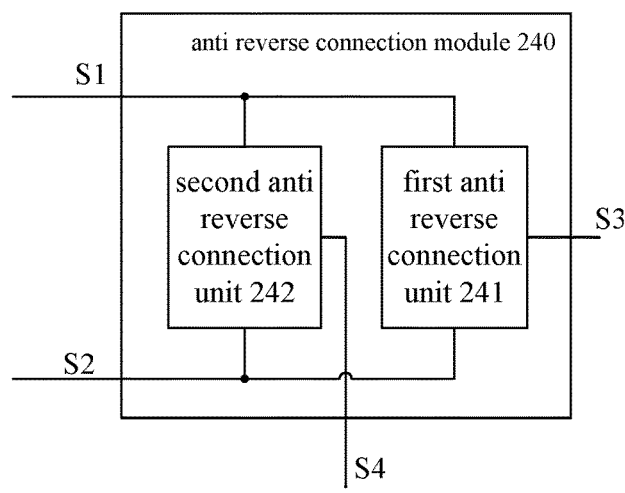
FIG. 13 is a block diagram illustrating an anti reverse connection module according to embodiment 1 of the present disclosure.

As an alternative implementation of embodiments of the present disclosure, as illustrated in FIG. 13, the anti reverse connection module 240 may include a first anti reverse connection unit 241, a second anti reverse connection unit 242, a first port S1, a second port S2, a third port S3 and a fourth port S4. The first anti reverse connection unit 241 is connected to the first port S1, the second port S2 and the third port S3 respectively, configured to control a connection between the third port S3 and one of the first port S1 and the second port S2 to be turned on. The second anti reverse connection unit 242 is connected to the fourth port S4, the first port S1 and the second port S2, configured to control a connection between the fourth port S4 and the other one of the first port S1 and the second port S2 to be turned on. If the anti reverse connection module 240 is applied in FIG. 11, connections between the anti reverse connection module 240, the third external interface 230 and the signal receiving module 210 can be described as follows. The first port S1 is connected to the third pin 231. The second port S2 is connected to the fourth pin 232. The third port S3 is electrically connected to the input end of the signal receiving module 210. The fourth port S4 is electrically connected to the output end of the signal receiving module 210. If the anti reverse connection module 240 is applied in FIG. 12, connections between the anti reverse connection module 240, the third external interface 230 and the signal receiving module 210 can be described as follows. The first port S1 is connected to the third pin 231. The second port S2 is connected to the fourth pin 232. The third port S3 is electrically connected to the first connection point T2. The fourth port S4 is electrically connected to the ground end of the slave communication device 20.

Figure 14:
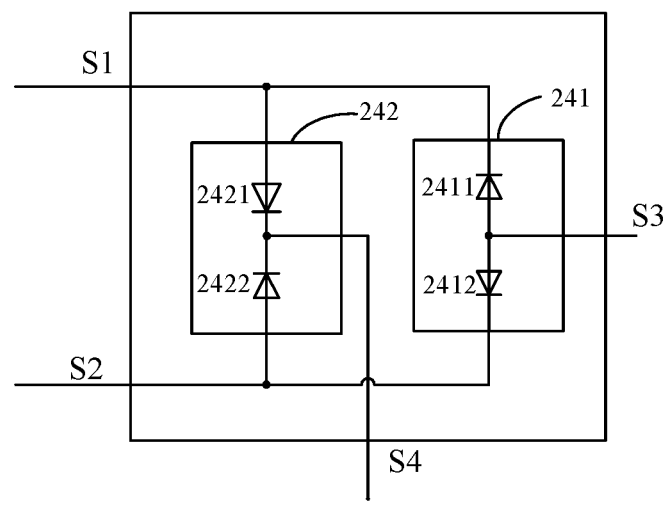
FIG. 14 is a schematic diagram illustrating an anti reverse connection module according to embodiment 1 of the present disclosure.
Figure 14A:
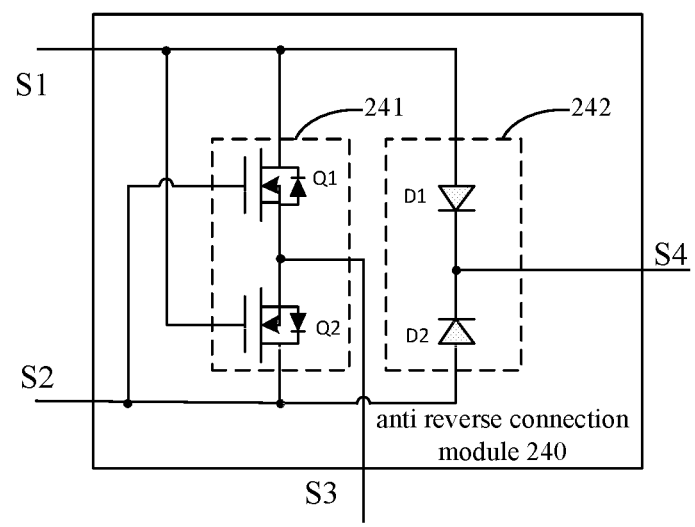
FIG. 14A-FIG. 14C are schematic diagrams illustrating an anti reverse connection module according to embodiment 6 of the present disclosure.
Figure 14B:
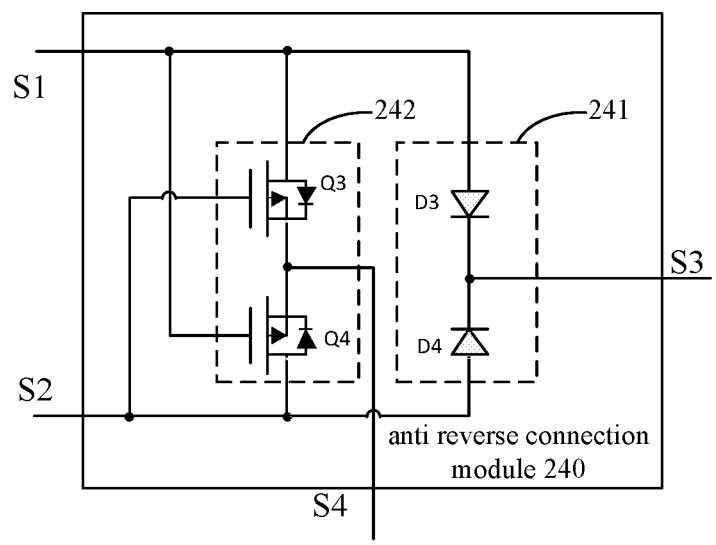
Figure 14C:
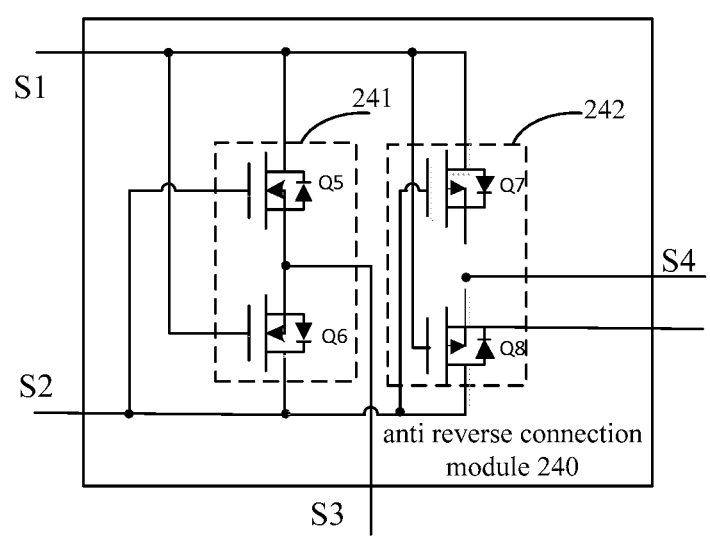

As an alternative implementation of embodiments of the present disclosure, as illustrated in FIG. 14, the first anti reverse connection unit 241 includes a first anti reverse connection element 2411 and a second anti reverse connection element 2412. The second anti reverse connection unit 242 includes a third anti reverse connection element 2421 and a fourth anti reverse connection element 2422. The first anti reverse connection element 2411 is connected between the first port S1 and the third port S3. The first anti reverse connection element 2411 can control a connection between the first port S1 and the third port S3 to be turned on. The second anti reverse connection element 2412 is connected between the second port S2 and the third port S3. The second anti reverse connection element 2412 can control a connection between the second port S2 and the third port S3 to be turned on. The third anti reverse connection element 2421 is connected between the fourth port S4 and the first port S1. The third anti reverse connection element 2421 can control a connection between the fourth port S4 and the first port S1 to be turned on. The fourth anti reverse connection element 2422 is connected between the fourth port S4 and the second port S2. The fourth anti reverse connection element 2422 can control a connection between the fourth port S4 and the second port S2 to be turned on. As an alternative implementation, each of the first anti reverse connection element 2411, the second anti reverse connection element 2412, the third anti reverse connection element 2421 and the fourth anti reverse connection element 2422 may be an anti reverse connection element such as a diode, a transistor, a MOS transistor, and the like, which is not limited herein. In a specific embodiment, a diode is configured as the anti reverse connection element, and such anti reverse connection module 240 is illustrated in FIG. 14. Thereby, the circuit in the anti reverse connection module 240 provided in embodiments of the present disclosure is easy to realize. Even if there are interfaces similar to Apple interface or USB TYPE-C interface that can realize reverse connection in the related art, these interfaces needs more hardware support, such that hardware cost is higher. While, the hardware cost of the anti reverse connection module in this embodiment is very low, the anti reverse connection function may be realized by using only four diodes, without a lot of hardware support. In addition, besides the diode, embodiments of the present disclosure further provide another three circuits that can implement the anti reverse connection module, as illustrated in FIG. 14A to FIG. 14C. Reference may be made to detail description in embodiment 6.

As illustrated in FIG. 11 and FIG. 12, the slave communication device 20 further includes a fixed load 270. As an alternative implementation of embodiments of the present disclosure, as illustrated in FIG. 11, one end of the fixed load 270 is connected to a connection point between the anti reverse connection module 240 and an input end of the signal receiving module 210. For convenience of description, this connection point is called as connection point T3 herein. In this alternative implementation, the fixed load 270 includes a charging switch 271 and a charging battery 272. The charging switch 271 is connected between the connection point T3 and the charging battery 272, configured to be controlled to switch on or off a connection between the connection point T3 and the charging battery 272.

As another alternative implementation of embodiments of the present disclosure, as illustrated in FIG. 12, one end of the fixed load 270 is electrically connected to the first connection point T2. In this alternative implementation, the fixed load 270 includes a charging switch 271 and a charging battery 272. The charging switch 271 is connected between the first connection point T2 and the charging battery 272, configured to be controlled to switch on or off a connection between the first connection point T2 and the charging battery 272. With the fixed load 270, when the master communication device 10 sends high level, the master communication device 10 may charge the slave communication device 20, thus the slave communication device 20 may perform communication and charging at the same time. Thereby, the slave communication device 20 may be controllable to charge an internal charging battery, such that the slave communication device 20 may supply itself when there is no master communication device 10 supplies power.

As illustrated in FIG. 11 and FIG. 12, the slave communication device 20 further includes a filter 280. As an alternative implementation of embodiments of the present disclosure, as illustrated in FIG. 11, the filter 280 is connected between the connection point T3 and the ground end (GND_S). Alternatively, the filter 280 is connected between the ground end (GND_S) and a connection point between the charging switch 271 and the charging battery 272, which is not shown in FIG. 11. As another alternative implementation of embodiments of the present disclosure, the filter 280 is connected between the first connection point T2 and the ground end (GND_S), which is not shown in FIG. 12. Alternatively, the filter 280 is connected between the ground end (GND_S) and a connection point between the charging switch 271 and the charging battery 272, as illustrated in FIG. 12. As an alternative implementation, the filter 280 may be a capacitor or other components, which is not limited herein. With the filter, glitches in the high level signals received by the third pin 231 of the third external interface 230 may be removed effectively, which makes the high level signals smooth, thus the charging battery may be charged continuously.

As an alternative implementation of embodiments of the present disclosure, as illustrated in FIG. 11 and FIG. 12, the slave communication device 20 further includes a first voltage division load element 291 and a second voltage division load element 292. As illustrated in FIG. 11, the first voltage division load element 291 and the second voltage division load element 292 are connected in series between the connection point T3 and the ground end. The first voltage division load element 291 is connected between the connection point T3 and the second voltage division load element 292. The signal receiving module 210 is electrically connected to the connection point T3 via the first voltage division load element 291. As illustrated in FIG. 12, the first voltage division load element 291 and the second voltage division load element 292 are connected in series between the connection point T2 and the ground end. The first voltage division load element 291 is connected between the connection point T2 and the second voltage division load element 292. The signal receiving module 210 is connected to the connection point T2 via the first voltage division load element 291. As an alternative implementation, the first voltage division load element 291 and the second voltage division load element 292 may be resistors or other load elements, which are not limited herein.

As illustrated in FIG. 11 and FIG. 12, the second voltage division load element 292 is connected between the ground end and the first voltage division load element 291. The signal receiving module 210 is connected to a connection point T4 (in FIG. 12) or T5 (in FIG. 11) between the first voltage division load element 291 and the second voltage division load element 292, so as to detect voltage at the connection point T4 (in FIG. 12) or T5 (in FIG. 11). In a specific embodiment, supply voltage of the power supply at the master communication device 10 may not be the same as a system detection voltage of the slave communication device 20. For example, the supply voltage of the power supply is 5V, while a maximum detection voltage that the signal receiving module 210 can bear is only 35V. In this case, there is a need to make a maximum voltage input to the signal receiving module 210 be less than or equal to 35V by voltage division, to ensure that the detection voltage of the signal receiving module 210 and the power supply are level-matched.

Thereby, with the slave communication device 20 provided in embodiments of the present disclosure, the signal receiving module 210 detects the voltage at the connection point T4 (equivalent to detecting level change at the connection point T2) or T5 (equivalent to detecting level change at the connection point T3), the voltage at the connection point T2 or T3 is a voltage signal received by the third external interface 230 from the first pin 131 of the master communication device 10. When in a silence state, the connection between the ground end and the connection point T2 (in FIG. 12) or T3 (in FIG. 11) is controlled off, the first pin 131 outputs a high level signal, the signal receiving module 210 detects a high level, and supplies power for the slave communication device 20. When receiving the data, the signal receiving module 210 detects a sudden fall on the voltage at the connection point T2 (in FIG. 12) or T3 (in FIG. 11), i.e., a low level pulse signal is detected. In this case, the voltage at the connection point T2 or T3 is pulled down by the ground end. It indicates that the slave communication device 20 is receiving data. The signal receiving module 210 obtains corresponding bit data according to continuously detected low level pulses. When the slave communication device 20 sends the data, the signal generation module 220 may control a connection of the signal generation unit between the connection point T2 (as illustrated in FIG. 12) and the ground end to be turned on or off according to the control signals of the main control chip 221, such that the third external interface 230 outputs a low level pulse signal or high level pulse signal, and then the corresponding bit data is transmitted. Thus, two-line communication between communication devices each having only two interfaces is realized.

In detail, as a specific implementation, the slave communication device 20 provided in embodiments of the present disclosure is illustrated in embodiment 2. FIG. 15 is a schematic circuit diagram of a communication system 100 according to an alternative embodiment of the present disclosure, in which reference may be made to detail description in embodiment 2. As another specific implementation, the slave communication device 20 provided in embodiments of the present disclosure is illustrated in embodiment 3. FIG. 16 is a schematic circuit diagram of a communication system 100 according to an alternative embodiment of the present disclosure, in which reference may be made to detail description in embodiment 3.

With the communication system according to embodiments of the present disclosure, two-line communication between communication devices each only having two interfaces may be realized. In addition, the slave communication device may obtain power from the master communication device, thus the charging may be performed at the time of performing communication. The slave communication device also has an anti reverse connection function, i.e., the communication may be performed no matter the slave communication device is positively or reversely connected to the master communication device.

Embodiment 2

In this embodiment, operating principle of the communication system 100 in embodiment 1 is illustrated. FIG. 15 is an alternative schematic circuit diagram of a communication system 100 according to embodiment 1 of the present disclosure. As illustrated in FIG. 15, in the alternative schematic circuit diagram, the communication system 100 includes a master communication device 10 and a slave communication device 20. An external interface J1 of the master communication device 10 is connected to an external interface J2 of the slave communication device 20. Structures and connections of the master communication device 10 and the slave communication device 20 are described as follows.

In the following, description is made for the master communication device 10 provided in embodiments of the present disclosure. In this alternative schematic circuit diagram, a signal generation unit 112 is an NMOS transistor Q3. A source (S) electrode of the NMOS transistor Q3 is taken as a first connection end 1121 of the signal generation unit 112, a drain (D) electrode of the NMOS transistor Q3 is taken as a second connection end 1122 of the signal generation unit 112, and a grid (G) electrode of the NMOS transistor Q3 is taken as a control end 1123 of the signal generation unit 112. The first external interface 130 is J1. The first pin 131 is pin 1 of J1. The second pin 132 is pin 2 of J1. The power supply is V_MPWR. The current stabilizing component 160 is an inductor L3. The freewheeling component 170 is a diode D1. The first voltage division load element 181 is a voltage division resistor R3. The second voltage division load element 182 is a voltage division resistor R11. The direct current isolation component 190 is C1. Pin 1 of J1 is connected to the power supply V_MPWR via the inductor L3 and the diode D1. L3 is connected between the power supply and pin 1 of J1. D1 is connected in parallel with L3. An anode of D1 is electrically connected to pin 1 of J1, and a cathode of D1 is electrically connected to the power supply. Pin 2 of J1 is electrically connected to a ground end GND_M of the power supply. A control port MO of the main control chip 111 is electrically connected to the G electrode of Q3 via the direct current isolation capacitor C1, the S electrode of Q3 is connected to the ground end GND_M, and the D electrode of Q3 is connected to a connection point T0 between L3 and pin 1 of J1. R19 is connected in series between the direct current isolation capacitor C1 and the S electrode of Q3. The voltage division resistors R3 and R11 are connected in series between the connection point T0 and the ground end GND_M. The signal receiving module 120 is electrically connected to the connection point T1 between the voltage division resistors R3 and R11, detecting the voltage at T1 (equivalent to detecting level change of T0). The D electrode and S electrode of Q3 are controlled, by signals output by the control port MO of the main control chip 111, to switch on or off a connection between the ground end GND_M and the connection point T0. The NMOS transistor may use but is not limited to following types: 2N7002, FDV301, FDV303 and the like. The diode may use but is not limited to following types: BAR43, BAR54, BAR46, BAR50 and the like. In addition, resistances of the voltage division resistors R3 and R11 may be selected according to demand, to ensure that the voltage detected by the detection port matches to the output voltage of the power supply, which will not be described in detail. Resistances of the voltage division resistors R3 and R11 may follow a formula of: $V\_T1=R11/(R3+R11)*V\_T0$.

In the following, operating principle of the master communication device 10 provided in embodiments of the present disclosure is briefly described.

In the silence state, Q3 is in an off state (in this case, the control port MO of the main control chip 111 sends a low level signal or does not send a signal), the voltage at the connection point T0 is the voltage of the power supply, which maintains a high level. The first pin outputs a high level (in this case, supplying power for the slave communication device 20). When the data is sent, the control port MO of the main control chip 111 sends a high level signal, to control Q3 to be turned on. The voltage at the connection point T0 is pulled down, then a low level pulse is generated, and the first pin outputs a low level pulse signal. After the data sending is finished, it is returned to the silence state. When the data is received, the signal receiving module 120 detects that the voltage at the connection point T1 suddenly falls to a low level from a high level. This indicates that the data is being received. The signal receiving module 120 may determine the received corresponding N-bit string according to time intervals between the continuously detected low level pulse signals.

In the following, description is made for the slave communication device 20 provided in embodiments of the present disclosure. In this alternative schematic circuit diagram, a signal generation unit 222 is an NMOS transistor Q5. A source (S) electrode of the NMOS transistor Q5 is taken as a first connection end 2221 of the signal generation unit 222, a drain (D) electrode of the NMOS transistor Q5 is taken as a second connection end 2222 of the signal generation unit 222, and a grid (G) electrode of the NMOS transistor Q5 is taken as a control end 2223 of the signal generation unit 222. The anti reverse connection module 240 includes a first anti reverse connection unit 241, a second anti reverse connection unit 242, a first port S1, a second port S2, a third port S3 and a fourth port S4. The first anti reverse connection unit 241 includes diodes D7 and D9. The second anti reverse connection unit 242 includes diodes D4 and D10. The third external interface 230 is J2. The third pin 231 is pin 1 of J2. The fourth pin 232 is pin 2 of J2. The first voltage division load element 291 is a voltage division resistor R20. The second voltage division load element 292 is a voltage division resistor R21. The direct current isolation component 250 is C2. Pin 1 of J2 is connected to S1. Pin 2 of J2 is connected to S2. S3 is connected to the D electrode of Q5. S4 is connected to the ground end GND_S of the slave communication device 20. An anode of D7 is connected to S1 (i.e., connected to the pin 1 of J2), and a cathode of D7 is connected to S3 (i.e., connected to the D electrode of Q5). An anode of D9 is connected to S4 (i.e., connected to the ground end GND_S), and a cathode of D9 is connected to S3 (i.e., connected to the D electrode of Q5). An anode of D4 is connected to S4 (i.e., connected to the ground end GND_S), and a cathode of D4 is connected to S1 (i.e., connected to the pin 1 of J2). An anode of D10 is connected to S4 (i.e., connected to the ground end GND_S), and a cathode of D10 is connected to S2 (i.e., connected to the pin 2 of J2). The control port SO of the main control chip 221 is connected to the G electrode of Q5 via the direct current isolation capacitor C2. The S electrode of Q5 is connected to the ground end GND_S. R22 is connected in series between the direct current isolation capacitor C2 and the S electrode of Q5. The voltage division resistors R20 and R21 are connected in series between the connection point T2 and the ground end GND_S. The signal receiving module 210 is electrically connected to the connection point T3 between the voltage division resistors R20 and R21. The signal receiving module 210 is configured to detect voltage at T3 (equivalent to detecting level change of T2). The D electrode and S electrode of Q5, under the control of output signals of the control port SO of the main control chip 221, switch a connection between the ground end GND_S and the connection point T2 to be turned on or off. The NMOS transistor may use but is not limited to following types: 2N7002, FDV301, FDV303 and the like. The diodes may use but are not limited to following types: BAR43, BAR54, BAR46, BAR50 and the like. In addition, the resistances of the voltage division resistors R20 and R21 may be selected according to demand, to ensure that the voltage detected by the signal receiving module 210 matches to the output voltage of the power supply at the master communication device 10, which will not be described in detail herein. The resistances of the voltage division resistors R20 and R21 may follow a formula of: V_T3=R21/(R20+R21)*V_T2.

In the following, operating principle of the slave communication device 20 provided in embodiments of the present disclosure is briefly described.

In the silence state, Q5 is in an off state (in this case, the control port SO does not send a signal or sends a low level signal), and the signal receiving module 210 detects the voltage at the connection point T2. The signal receiving module 210 detects a high level continuously, in this case, the slave communication device 20 may be charged. When data is received, the signal receiving module 210 detects that the voltage at the connection point T2 suddenly falls to a low level from the high level. It indicates that the data is being received. The signal receiving module 210 may determine corresponding bit data according to time intervals between the continuously detected low level pulse signals. When the data is sent, the control port SO of the main control chip 221 sends a high level signal to control Q5 to be turned on. The voltage at the connection point T2 is pulled down, generating a low level pulse. The external interface J2 (one of pin 1 and pin 2 that is connected to the pin 1 of J1 of the master communication device 10) outputs the low level pulse signal to the pin 1 of J1 of the master communication device 10. The slave communication device 20 returns to the silence state after the data is sent.

In this embodiment, J2 of the slave communication device 20 may be positively connected or be reversely connected to J1. That is, pin 1 of J2 being connected to pin 1 of J1 and pin 2 of J2 being connected to pin 2 of J1, refers to that J2 is positively connected to J1, or pin 2 of J2 being connected to pin 1 of J1 and pin 1 of J2 being connected to pin 2 of J1, refers to that J2 is reversely connected to J1. When J2 of the slave communication device 20 is positively connected to J1, if Q5 is in an off state, a conduction flow of the anti reverse connection module 240 is: pin 1 of J1→pin 1 of J2→D7→T2→R20→R21→GND_S→D10→pin 2 of J2→pin 2 of J1. If Q5 is in an on state, a conduction flow of the anti reverse connection module 240 is: pin 1 of J1→pin 1 of J2→D7→T2→Q5→GND_S→D10→pin 2 of J2→pin 2 of J1.

When J2 of the slave communication device 20 is reversely connected to J1, if Q5 is in an off state, a conduction flow of the anti reverse connection module 240 is: pin 1 of J1→pin 2 of J2→D9→T2→R20→R21→GND_S→D4→pin 1 of J2→pin 2 of J1. If Q5 is in an on state, a conduction flow of the anti reverse connection module 240 is: pin 1 of J1→pin 2 of J2→D9→T2→Q5→GND_S→D4→pin 1 of J2→pin 2 of J1.

In the following, operating principle of the communication system 100 provided in embodiments of the present disclosure is briefly described.

In the silence state, at the master communication device 10 side: Q3 is in an off state, the voltage at the connection point T0 is the voltage of the power supply, which maintains a high level, and pin 1 of J1 outputs a high level, to supply power for the slave communication device 20. The signal receiving module 120 detects the voltage at the connection point T0. The signal receiving module 120 detects a high level continuously, and the first interface outputs a high level. At the slave communication device 20 side: Q5 is in an off state, the voltage at the connection point T2 is a high level voltage signal received from pin 1 of J1 by J2, and the voltage at the connection point T2 maintains a high level. The signal receiving module 210 detects the voltage at the connection point T2, and the signal receiving module 210 detects a high level continuously.

When the master communication device 10 sends data, the control port MO of the main control chip 111 of the master communication device 10 sends a high level signal to control Q3 to be turned on. The voltage at the connection point T0 is pulled down. Pin 1 of J1 outputs a low level pulse signal. The master communication device 10 returns to the silence state after the data is sent. While the slave communication device 20 receives the data, the signal receiving module 210 detects that the voltage at the connection point T2 suddenly falls to a low level from a high level. It indicates that the data is being received. The signal receiving module 210 of the slave communication device 20 may determine corresponding bit data according to time intervals between the continuously detected low level pulse signals.

When the slave communication device 20 sends data, the control port SO of the main control chip 221 of the slave communication device 20 sends a high level signal to control Q5 to be turned on. The voltage at the connection point T2 is pulled down. The external interface J2 (one of pin 1 and pin 2 of J2 that is connected to pin 1 of J1 of the master communication device 10) outputs a low level pulse signal to pin 1 of J1 of the master communication device 10. The slave communication device 20 returns to the silence state after the data is sent. While the master communication device 10 receives the data, the signal receiving module 120 detects that the voltage at the connection point T1 suddenly falls to a low level from a high level. It indicates that the data is being received. The signal receiving module 120 of the master communication device 10 may determine corresponding bit data according to time intervals between the continuously detected low level pulse signals.

It should be noted that, both the master communication device and the slave communication device in embodiments of the present disclosure may only perform one-way communication, i.e., they cannot receive data when sending data, and cannot send data when receiving data. After the master communication device finishes sending data, the master communication device may send an instruction indicating that data sending is finished to the slave communication device. The slave communication device stops receiving data, and then begins to send data. At this time, the master communication device may detect the data sent from the slave communication device, and the master communication device enters a data receiving state.

As an alternative implementation of embodiments of the present disclosure, the master communication device and the slave communication device may adopt same-type external interfaces or different-type external interfaces, same-type signal generation units or different-type signal generation units, same-type voltage division load elements or different-type voltage division load elements, same-type direct current isolation components or different-type direct current isolation components, as long as functions of respective components in embodiments of the present disclosure may be realized, they should all fall within the protection scope of the present disclosure.

With the communication system provided by this embodiment, it can realize two-line communication between communication devices each having only two interfaces. In addition, the slave communication device may acquire power from the master communication device, thus can be charged while performing communication. The slave communication device further has an anti reverse connection function, thus the communication may be performed no matter the slave communication device is positively or reversely connected to the master communication device.

Embodiment 3

In this embodiment, operating principle of the communication system 100 in embodiment 1 is illustrated. FIG. 16 is an alternative schematic circuit diagram of a communication system 100 according to embodiment 1 of the present disclosure. As illustrated in FIG. 16, in the alternative schematic circuit diagram, the communication system 100 includes a master communication device 10 and a slave communication device 20. An external interface J1 of the master communication device 10 is connected to an external interface J2 of the slave communication device 20. Structures and connections of the master communication device 10 and the slave communication device 20 are described as follows.

In the following, description is made for the master communication device 10 provided in embodiments of the present disclosure. In this alternative schematic circuit diagram, a signal generation unit 112 is a PMOS transistor Q1. A source (S) electrode of the PMOS transistor Q1 is taken as a first connection end 1121 of the signal generation unit 112, a drain (D) electrode of the PMOS transistor Q1 is taken as a second connection end 1122 of the signal generation unit 112, and a grid (G) electrode of the PMOS transistor Q1 is taken as a control end 1123 of the signal generation unit 112. The first external interface 130 is J1. The first pin 131 is pin 1 of J1. The second pin 132 is pin 2 of J1. The power supply is VDD_M. Pin 1 of J1 is connected to the D electrode of Q1. The S electrode of Q1 is connected to the power supply VDD_M. The G electrode of Q1 is connected to the control port MO of the main control chip 111. The D electrode and the S electrode of Q1 are controlled, by signals output by the control port MO of the main control chip 111, to switch on or off a connection between VDD_M and pin 1 of J1. The sampling resistor R1 is connected between pin 2 of J1 and the ground end GND_M. The signal receiving module 120 is connected to pin 2 of J1. The signal receiving module 120 includes a comparator A1. A non-inverting input end of the comparator A1 is connected to a connection point between the signal receiving module 120 and pin 2 of J1. A reference voltage Vref is input to an inverting input end of the comparator A1. The comparator A1 compares a voltage input to pin 2 of J1 with the reference voltage Vref. When the voltage input to pin 2 of J1 is larger than the reference voltage Vref, a high level is output, otherwise a low level is output. The PMOS transistor may use but is not limited to following types: 2N7002, FDV301, FDV303 and the like. The resistance of the sampling resistor R1 may be selected according to demand, to ensure that there is a significant difference between the voltage detected by the detection port and the reference voltage Vref, which is not described in detail. Settings of the reference voltage Vref may be set according to the resistance of R1, such that the value of Vref is significantly smaller than the voltage value across both ends of the sampling resistor R1.

In the following, operating principle of the master communication device 10 provided in embodiments of the present disclosure is briefly described.

In the silence state, Q1 is in an on state (at this time, the control port MO of the main control chip 111 sends a low level signal or does not send a signal). VDD_M continuously supplies a high level, such that Vs>Vg, Q1 is turned on, and pin 1 outputs a high level, power is supplied for the slave communication device 20. When the data is sent, the control port MO of the main control chip 111 sends a high level signal, to control Q1 off. Pin 1 outputs a low level signal. After the date sending is finished, the master communication device 10 returns to the silence state. In this case, the control port MO of the main control chip 111 sends a low level signal or does not send a signal, and Q1 is normally turned on. When the data is received, the signal receiving module 120 detects a voltage across both ends of the load resistor R1, and detects that the voltage of the signal receiving module 120 suddenly rises to a high level from a low level, which indicates that data is being received. The comparator A1 compares the voltage detected by the signal receiving module 120 and the reference voltage Vref. The signal receiving module 120 may continuously detect time intervals between high level pulse signals and determine corresponding bit data according to the high or low level output by the comparator A1.

In the following, description is made for the slave communication device 20 provided in embodiments of the present disclosure. In this alternative schematic circuit diagram, the signal generation unit 222 is an NMOS transistor Q2. A source (S) electrode of the NMOS transistor Q2 is taken as a first connection end 2221 of the signal generation unit 222, a drain (D) electrode of the NMOS transistor Q2 is taken as a second connection end 2222 of the signal generation unit 222, and a grid (G) electrode of the NMOS transistor Q2 is taken as a control end 2223 of the signal generation unit 222. The anti reverse connection module 240 includes a first anti reverse connection unit 241, a second anti reverse connection unit 242, a first port S1, a second port S2, a third port S3 and a fourth port S4. The first anti reverse connection unit 241 includes diodes D7 and D9. The second anti reverse connection unit 242 includes diodes D4 and D10. The third external interface 230 is J2. The third pin 231 is pin 1 of J2. The fourth pin 232 is pin 2 of J2. The load resistor is R2. The battery switcher is K1. The charging battery is BATT. The filter is C3. Pin 1 of J2 is connected to S1. Pin 2 of J2 is connected to S2. S3 is connected to the D electrode of Q2. A connection between the ground end GND_S and the connection point T2 is turned on or off under the control of the output signal of the control port SO of the main control chip 221. The load resistor R2 is connected between the D electrode of Q2 and the connection point T2 between the signal generation unit 222 and the signal receiving module 210. The battery switcher K1 and the charging battery BATT are connected in series between the connection point T2 and the ground end GND_S of the slave communication device. One end of the filter C3 is connected to a connection point between the battery switcher K1 and the charging battery BATT, and the other end of the filter C3 is connected to the ground end GND_S. The NMOS transistor may use but is not limited to following types: 2N7002, FDV301, FDV303 and the like. The diodes may use but are not limited to following types: BAR43, BAR54, BAR46, BAR50 and the like. In addition, the resistance of resistor R2 may be selected according to demand, to ensure that there is a significant difference between the voltage detected by the detection port and the reference voltage Vref, which is not described in detail.

In the following, operating principle of the slave communication device 20 provided in embodiments of the present disclosure is briefly described.

In the silence state, Q2 is in an off state (in this case, the control port SO of the main control chip 221 does not send a signal or sends a low level signal), and the signal receiving module 210 detects the voltage at the connection point T2. The signal receiving module 210 detects a high level continuously, the charging battery may be charged, and power is supplied for the slave communication device 20. When data is received, the signal receiving module 210 detects that the voltage at the connection point T2 suddenly falls to a low level from the high level. It indicates that data is being received. The signal receiving module 210 may determine corresponding bit data according to time intervals between the continuously detected low level pulse signals. When the data is sent, the control port SO of the main control chip 221 sends a high level signal to control Q2 to be turned on. Current passing through a loop from the connection point T2 of the slave communication device 20 to the load resistor R1 of the master communication device 10 may increase. The current from T2 passes through R2→GND_S→R1→GND_M. The master communication device 10 receives data by detecting voltage change of the load resistor R1, and returns to the silence state after the data sending is finished.

In this embodiment, J2 of the slave communication device 20 may be positively connected or be reversely connected to J1. That is, pin 1 of J2 being connected to pin 1 of J1 and pin 2 of J2 being connected to pin 2 of J1, refers to that J2 is positively connected to J1, or pin 2 of J2 being connected to pin 1 of J1 and pin 1 of J2 being connected to pin 2 of J1, refers to that J2 is reversely connected to J1. When J2 of the slave communication device 20 is positively connected to J1, if Q2 is in an off state, a conduction flow of the anti reverse connection module 240 is: pin 1 of J1→pin 1 of J2→D7→T2→SI. If Q2 is in an on state, a conduction flow of the anti reverse connection module 240 is: pin 1 of J1→pin 1 of J2→D7→T2→Q2→GND_S→A10→pin 2 of J2→pin 2 of J→GND_M.

When J2 of the slave communication device 20 is reversely connected to J1, if Q2 is in an off state, a conduction flow of the anti reverse connection module 240 is: pin 1 of J1→pin 2 of J2→D9→T2→SI. If Q2 is in an on state, a conduction flow of the anti reverse connection module 240 is: pin 1 of J1→pin 2 of J2→D9→T2→Q2→GND_S→D4→pin 1 of J2→pin 2 of J1→GND_M.

In the following, operating principle of the communication system 100 provided in embodiments of the present disclosure is briefly described.

In the silence state, at the master communication device 10 side: Q1 is in an on state (in this case, the control port MO of the main control chip 111 sends a low level signal or does not send a signal). VDD_M continuously supplies a high level, such that Vs>Vg, Q1 is turned on, and pin 1 of J1 outputs a high level. The signal receiving module 120 of the master communication device 10 detects a voltage across both ends of the load resistor R1. At the slave communication device 20 side: Q2 is in an off state (in this case, the control port SO of the main control chip 221 does not send a signal or sends a low level signal). The voltage at the connection point T2 is a high level voltage signal received from pin 1 of J1 by J2. The voltage at the connection point T2 maintains the high level. The signal receiving module 210 of the slave communication device 20 detects the voltage at the connection point T2. The signal receiving module 210 detects a high level continuously.

The master communication device 10 sends data. The control port MO of the main control chip 111 of the master communication device 10 sends a high level signal to control Q1 off. Pin 1 of J1 outputs a low level signal. The master communication device 10 returns to the silence state after the data is sent. In this case, the control port MO of the main control chip 111 sends a low level signal or does not send a signal, and Q1 is normally turned on. When the slave communication device 20 receives the data, the signal receiving module 210 detects that the voltage at the connection point T2 suddenly falls to a low level from a high level. It indicates that the data is being received. The signal receiving module 210 of the slave communication device 20 may determine corresponding bit data according to time intervals between the continuously detected low level pulse signals.

The slave communication device 20 sends data. The control port SO of main control chip 221 of the slave communication device 20 sends a high level signal to control Q2 to be turned on. Current passing through a loop from the connection point T2 of the slave communication device 20 to the load resistor R1 of the master communication device 10 may increase. The current from T2 passes through R2→GND_S→R1→GND_M. The master communication device 10 receives data by detecting voltage change of the load resistor R1, and returns to the silence state after the data sending is finished. The master communication device 10 receives data. The signal receiving module 120 detects the voltage across both ends of the load resistor R1. If the voltage suddenly increases, it indicates data is being received. The comparator A1 compares the voltage detected by the signal receiving module 120 and the reference voltage Vref. The signal receiving module 120 of the master communication device 10 may determine corresponding bit data according to time intervals between continuously detected high level pulse signals.

It should be noted that, both the master communication device and the slave communication device in embodiments of the present disclosure may only perform one-way communication, i.e., they cannot receive data when sending data, and cannot send data when receiving data. After the master communication device finishes sending data, the master communication device may send an instruction indicating that the data sending is finished to the slave communication device. The slave communication device stops receiving data, and then begins to send data. At this time, the master communication device may detect the data sent from the slave communication device, and the master communication device enters a data receiving state.

As an alternative implementation of embodiments of the present disclosure, the master communication device and the slave communication device may adopt same-type external interfaces or different-type external interfaces, same-type signal generation units or different-type signal generation units, same-type voltage division load elements or different-type voltage division load elements, same-type direct current isolation components or different-type direct current isolation components, as long as functions of respective components in embodiments of the present disclosure may be realized, they should all fall within the protection scope of the present disclosure.

With the communication system provided by this embodiment, it can realize two-line communication between communication devices each having only two interfaces. In addition, the slave communication device may acquire power from the master communication device, thus can be charged while performing communication. The slave communication device further has an anti reverse connection function, thus the communication may be performed no matter the slave communication device is positively or reversely connected to the master communication device.

Embodiment 6

This embodiment provides three specific circuits for implementing the anti reverse connection module 240, as illustrated in FIG. 14A to FIG. 14C, and description is made for the circuit principle of the anti reverse connection module 240 in the slave communication device 20 in embodiment 1.

FIG. 14A is an alternative schematic circuit diagram illustrating the anti reverse connection module 240 according to embodiment 1 of the present disclosure.

As illustrated in FIG. 14A, the first anti reverse connection element 2411 and the second anti reverse connection element 2412 in the first anti reverse connection unit 241 adopt NMOS transistors, i.e. Q1 and Q2 respectively. The third anti reverse connection element 2421 and the fourth anti reverse connection element 2422 in the second anti reverse connection unit 242 adopt diodes, i.e. D1 and D2 respectively. The first anti reverse connection element 2411 (Q1) is connected between the first port S1 and the third port S3. As illustrated in FIG. 14A, the drain (D) electrode of Q1 is electrically connected to S1, the source (S) electrode of Q1 is electrically connected to S3, and the grid (G) electrode of Q1 is electrically connected to S2, thus turning the connection between the first port S1 and the third port S3 on. The second anti reverse connection element 2412 (Q2) is connected between the second port S2 and the third port S3. As illustrated in FIG. 14A, the drain (D) electrode of Q2 is electrically connected to S2, the source (S) electrode of Q2 is electrically connected to S3, and the grid (G) electrode of Q2 is electrically connected to S1, thus turning the connection between the second port S2 and the third port S3 on. The third anti reverse connection element 2421 (D1) is connected between the fourth port S4 and the first port S1, thus turning the connection between the fourth port S4 and the first port S1 on. The fourth anti reverse connection element 2422 (D2) is connected between the fourth port S4 and the second port S2, thus turning the connection between the fourth port S4 and the second port S2 on.

In the following, for example, high voltage and low voltage are applied to the first port S1 and the second port S2 respectively. With reference to FIG. 14A, description is made to specific circuit principle of the anti reverse connection module 240 according to this embodiment.

When high voltage is applied to S1 and low voltage is applied to S2, according to conduction characteristics of NMOS transistors and the diodes, the high voltage is applied to an anode of D1, thus D1 is turned on. The low voltage is applied to an anode of D2, thus D2 is cut off. The low voltage is applied to the grid electrode of Q1, Vgs<Vt, thus Q1 is cut off. The high voltage is applied to the grid electrode of Q2, Vgs>Vt, thus Q2 is turned on. At this time, the drain electrode of the NMOS transistor Q2 is connected to the low voltage, thus current flows from the source electrode of Q2 to the drain electrode of Q2. It is equivalent to that the NMOS transistor Q2 is turned on via a parasitic diode, with a small voltage drop. Therefore, the current flow direction is: S1→D1→S4→S3→Q2→S2, thus forming a loop.

When low voltage is applied to S1 and high voltage is applied to S2, according to conduction characteristics of NMOS transistors and the diodes, the low voltage is applied to the anode of D1, thus D1 is cut off. The high voltage is applied to the anode of D2, thus D2 is turned on. The high voltage is applied to the grid electrode of Q1, Vgs>Vt, thus Q1 is turned on. At this time, the drain electrode of the NMOS transistor Q1 is connected to the low voltage, thus current flows from the source electrode of Q1 to the drain electrode of Q1. It is equivalent to controlling the NMOS transistor Q1 on via a parasitic diode, with a small voltage drop. The low voltage is applied to the grid electrode of Q2, Vgs<Vt, thus Q2 is cut off. Therefore, the current flow direction is: S2→D2→S4→S3→Q1→S1, thus forming a loop.

FIG. 14B is another alternative schematic circuit diagram illustrating the anti reverse connection module 240 according to embodiment 1 of the present disclosure.

As illustrated in FIG. 14B, the first anti reverse connection element 2411 and the second anti reverse connection element 2412 in the first anti reverse connection unit 241 adopt diodes, i.e. D3 and D4 respectively. The third anti reverse connection element 2421 and the fourth anti reverse connection element 2422 in the second anti reverse connection unit 242 adopt PMOS transistors, i.e. Q3 and Q4 respectively. The first anti reverse connection element 2411

(D3) is connected between the first port S1 and the third port S3, thus controlling the connection between the first port S1 and the third port S3 to be turned on. The second anti reverse connection element 2412 (D4) is connected between the second port S2 and the third port S3, thus controlling the connection between the second port S2 and the third port S3 to be turned on. The third anti reverse connection element 2421 (Q3) is connected between the fourth port S4 and the first port S1. As illustrated in FIG. 14B, the drain (D) electrode of Q3 is electrically connected to S1, the source (S) electrode of Q3 is electrically connected to S3, and the grid (G) electrode of Q3 is electrically connected to S2, thus controlling the connection between the fourth port S4 and the first port S1 to be turned on. The fourth anti reverse connection element 2422 (Q4) is connected between the fourth port S4 and the second port S2. As illustrated in FIG. 14B, the drain (D) electrode of Q4 is electrically connected to S2, the source (S) electrode of Q4 is electrically connected to S3, and the grid (G) electrode of Q4 is electrically connected to S1, thus controlling the connection between the fourth port S4 and the second port S2 to be turned on.

In the following, for example, high voltage and low voltage are applied to the first port S1 and the second port S2 respectively. With reference to FIG. 14B, description is made to specific circuit principle of the anti reverse connection module 240 according to this embodiment.

When high voltage is applied to S1 and low voltage is applied to S2, according to conduction characteristics of PMOS transistors and the diodes, the low voltage is applied to the grid electrode of Q3, Vgs<Vt, thus Q3 is turned on. In this case, the drain electrode of the PMOS transistor Q3 is connected to the high voltage, thus current flows from the drain electrode of Q3 to the source electrode of Q3. It is equivalent to controlling the PMOS transistor Q3 to be turned on via a parasitic diode, with a small voltage drop. The high voltage is applied to the grid electrode of Q4, Vgs>Vt, thus Q4 is cut off. The high voltage is applied to a cathode of D3, thus D3 is cut off. The low voltage is applied to a cathode of D4, thus D4 is turned on. Therefore, the current flow direction is: S1→Q3→S4→S3→D4→S2, thus forming a loop.

When low voltage is applied to S1 and high voltage is applied to S2, according to conduction characteristics of PMOS transistors and diodes, the high voltage is applied to the grid electrode of Q3, Vgs>Vt, thus Q3 is cut off. The low voltage is applied to the grid electrode of Q4, Vgs<Vt, thus Q4 is turned on. In this case, the drain electrode of the PMOS transistor Q4 is connected to the high voltage, thus current flows from the drain electrode of Q4 to the source electrode of Q4. It is equivalent to controlling the PMOS transistor Q4 on via a parasitic diode, with a small voltage drop. The low voltage is applied to a cathode of D3, thus D3 is turned on. The high voltage is applied to a cathode of D4, thus D4 is cut off. Therefore, the current flow direction is: S2→Q4→S4→S3→D3→S1, thus forming a loop.

FIG. 14C is another alternative schematic circuit diagram illustrating the anti reverse connection module 240 according to embodiment 1 of the present disclosure.

As illustrated in FIG. 14C, the first anti reverse connection element 2411 and the second anti reverse connection element 2412 in the first anti reverse connection unit 241 adopt NMOS transistors, i.e. Q5 and Q6 respectively. The third anti reverse connection element 2421 and the fourth anti reverse connection element 2422 in the second anti reverse connection unit 242 adopt PMOS transistors, i.e. Q7 and Q8 respectively. The first anti reverse connection element 2411 (Q5) is connected between the first port S1 and the third port S3. As illustrated in FIG. 14C, the drain (D) electrode of Q5 is electrically connected to S1, the source (S) electrode of Q5 is electrically connected to S3, and the grid (G) electrode of Q5 is electrically connected to S2, thus controlling the connection between the first port S1 and the third port S3 to be turned on. The second anti reverse connection element (Q6) 2412 is connected between the second port S2 and the third port S3. As illustrated in FIG. 14C, the drain (D) electrode of Q6 is electrically connected to S2, the source (S) electrode of Q6 is electrically connected to S3, and the grid (G) electrode of Q6 is electrically connected to S1, thus controlling the connection between the second port S2 and the third port S3 to be turned on. The third anti reverse connection element 2421 (Q7) is connected between the fourth port S4 and the first port S1. As illustrated in FIG. 14C, the drain (D) electrode of Q7 is electrically connected to S1, the source (S) electrode of Q7 is electrically connected to S4, and the grid (G) electrode of Q7 is electrically connected to S2, thus controlling the connection between the fourth port S4 and the first port S1 to be turned on. The fourth anti reverse connection element 2422 (Q8) is connected between the fourth port S4 and the second port S2. As illustrated in FIG. 14C, the drain (D) electrode of Q8 is electrically connected to S2, the source (S) electrode of Q8 is electrically connected to S4, and the grid (G) electrode of Q8 is electrically connected to S1, thus controlling the connection between the fourth port S4 and the second port S2 to be turned on.

In the following, for example, high voltage and low voltage are applied to the first port S1 and the second port S2 respectively. With reference to FIG. 14C, description is made to specific circuit principle of the anti reverse connection module 240 according to this embodiment.

When high voltage is applied to S1 and low voltage is applied to S2, according to conduction characteristics of NMOS transistors and PMOS transistors, the low voltage is applied to the grid electrode of the PMOS transistor Q7, Vgs<Vt, thus Q7 is turned on. In this case, the drain electrode of the PMOS transistor Q7 is connected to the high voltage, thus current flows from the drain electrode of Q7 to the source electrode of Q7. It is equivalent to controlling the PMOS transistor Q7 to be turned on via a parasitic diode, with a small voltage drop. The high voltage is applied to the grid electrode of PMOS transistor Q8, Vgs>Vt, thus Q8 is cut off. While, the low voltage is applied to the grid electrode of the NMOS transistor Q5, Vgs<Vt, thus Q5 is cut off. The high voltage is applied to the grid electrode of the NMOS transistor Q6, thus Vgs>Vt, and Q6 is turned on. In this case, the drain electrode of NMOS transistor Q6 is connected to the low voltage, thus current flows from the source electrode of Q6 to the drain electrode of Q6. It is equivalent to controlling the NMOS transistor Q6 to be turned on via a parasitic diode, with a small voltage drop. Therefore, the current flow direction is: S1→Q7→S4→S3→Q6→S2, thus forming a loop.

When low voltage is applied to S1 and high voltage is applied to S2, according to conduction characteristics of NMOS transistors and PMOS transistors, the high voltage is applied to the grid electrode of the PMOS transistor Q7, Vgs>Vt, thus Q7 is cut off. The low voltage is applied to the grid electrode of PMOS transistor Q8, Vgs<Vt, thus Q8 is turned on. In this case, the drain electrode of the PMOS transistor Q8 is connected to the high voltage, thus current flows from the drain electrode of Q8 to the source electrode of Q8. It is equivalent to controlling the PMOS transistor Q8 to be turned on via a parasitic diode, with a small voltage drop. While, the high voltage is applied to the grid electrode of the NMOS transistor Q5, Vgs>Vt, thus Q5 is turned on. In this case, the drain electrode of the NMOS transistor Q5 is connected to the low voltage, thus current flows from the source electrode of Q5 to the drain electrode of Q5. It is equivalent to controlling the NMOS transistor Q5 to be turned on via a parasitic diode, with a small voltage drop. The low voltage is applied to the grid electrode of the NMOS transistor Q6, thus Vgs<Vt, and Q6 is cut off. Therefore, the current flow direction is: S2→Q8→S4→S3→Q5→S1, thus forming a loop.

In detail, in this embodiment, each of the NMOS transistors and PMOS transistors adopts a single MOS transistor. The single MOS transistor, due to manufacturing technique or other factors, has one parasitic diode, also called as an internal diode. Generally, when small current passes through the NMOS transistor and PMOS transistor, a voltage drop generated by current passing through the parasitic diode is smaller than that generated by current passing through an ordinary diode. In addition, under normal circumstances, a conduction direction of an NMOS transistor is from the drain electrode to the source electrode, that is, the voltage of drain electrode is higher than that of the source electrode, so as to achieve switching performance of the NMOS transistor. However, in this embodiment, the current conduction is realized by using the isolation characteristic of the NMOS transistor. That is, in this embodiment, the voltage of source electrode is higher than that of the drain electrode, thus it is equivalent to realizing the reverse current conduction via the parasitic diode, thus decreasing the voltage drop generated by the conduction. Correspondingly, under normal circumstances, a conduction direction of a PMOS transistor is from the source electrode to the drain electrode, that is, the voltage of source electrode is higher than that of the drain electrode, so as to achieve switching performance of the PMOS transistor. However, in this embodiment, the current conduction is realized by using the isolation characteristic of the PMOS transistor. That is, in this embodiment, the voltage of drain electrode is higher than that of the source electrode, thus it is equivalent to realizing the reverse current conduction via the parasitic diode, thus decreasing the voltage drop generated by the conduction.

In detail, in this embodiment, all of the diodes D1-D4 in this embodiment may be germanium diodes, or may also be silicon diodes. Alternatively, they may be Schottky diodes, as long as a diode function can be realized. In addition, because of the characteristic of the diode, a certain voltage drop may be generated by the current passing through the diode. In an electronic device using small voltage for power supply, a diode having a small conduction voltage drop can be used. Since the voltage drop is the characteristic of the diode, it is not described in detail herein.

In a specific implementation of this embodiment, the anti reverse connection module 240 may further include a protection resistor. The protection resistor may be added beside each MOS transistor (including the NMOS and the PMOS). The protection resistor may be connected in series between the grid electrode of the NMOS transistor (or the PMOS transistor) and one of S1 and S2. One of S1 and S2 refers to one of S1 and S2 that is connected to the grid electrode of the NMOS transistor (or the PMOS transistor) in FIG. 14A-FIG. 14C. The protection resistor in this embodiment may be configured to adjust turning-on/turning-off speed of the MOS transistor. When the resistance of the protection resistor connected to the grid electrode is small, the turning-on/turning-off speed of the MOS transistor is fast, with small switching loss. In contrast, when the resistance of the protection resistor connected to the grid electrode is large, the turning-on/turning-off speed of the MOS transistor is slow, with large switching loss. However, too fast turning-on/turning-off speed of the MOS transistor may greatly increase the change rate of current and voltage of the MOS transistor, thus generating large interference and affecting operation of the whole device. Therefore, the resistance of the protection resistor in embodiments of the present disclosure may be set according to actual demand. In addition, a parasitic capacitor may be formed between the grid electrode and the source electrode of the MOS transistor. Thus a strong oscillation may be generated under driven of the voltage of the grid electrode. The protection resistor together with the parasitic capacitor connected in series between the grid electrode and the source electrode of the MOS transistor may form a serial anti oscillation circuit, which may reduce the oscillation.

It can be seen from above examples that, when the anti reverse connection module 240 is applied in the slave communication device, the load of the slave communication device may be connected to the external interface of the slave communication device via the anti reverse connection module 240. Thus, when the third external interface 230 is connected to the first external interface of the master communication device, no matter the third external interface is positively connected or reversely connected to the first external interface, it can ensure that the circuit of the slave communication device may normally operate. In addition, in this embodiment, the MOS transistor is adopted to realize the anti reverse connection circuit, compared with a mode using four diodes to implement the ant reverse connection circuit, it can effectively reduce the voltage drop. For the electronic device using relatively small voltage, it can improve utilization of electric energy and reduce loss.

It will be understood that, the flow chart or any process or method described herein in other manners may represent a module, segment, or portion of code that comprises one or more executable instructions to implement the specified logic function(s) or that comprises one or more executable instructions of the steps of the progress. Although the flow chart shows a specific order of execution, it is understood that the order of execution may differ from that which is depicted. For example, the order of execution of two or more boxes may be scrambled relative to the order shown.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It can be understood by those skilled in the art that all or part of the steps in the method of the above embodiments can be implemented by instructing related hardware via programs, the program may be stored in a computer readable storage medium, and the program includes one step or combinations of the steps of the method when the program is executed.

In addition, each functional unit in the present disclosure may be integrated in one progressing module, or each functional unit exists as an independent unit, or two or more functional units may be integrated in one module. The integrated module can be embodied in hardware, or software. If the integrated module is embodied in software and sold or used as an independent product, it can be stored in the computer readable storage medium.

The above-mentioned storage medium may be a read-only memory, a magnetic disc, an optical disc, etc.

Reference throughout this specification to "an embodiment," "some embodiments," "an example," "a specific example," or "some examples," means that a particular feature, structure, material, or characteristic described in connection with the embodiment or example is included in at least one embodiment or example of the present disclosure. Thus, the appearances of the phrases such as "an embodiment," "some embodiments," "an example," "a specific example," or "some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure. The scope of the present disclosure is defined by the claims and their equivalents.

What is claimed is:

1. A communication device, comprising:
    a first external interface comprising a first pin and a second pin; and
    a signal generation module electrically connected to the first pin, wherein the signal generation module is configured to generate X signals according to time interval corresponding to an N-bit string to be sent, wherein the time interval corresponding to the N-bit string to be sent represents time interval between start times of each two adjacent signals, different bit strings correspond to different time intervals respectively, where N≥1, X≥1, and X is a natural number;
    wherein, the first external interface is configured to send the X signals via the first pin,
    wherein, the communication device further comprises: a signal receiving module connected to the first external interface; wherein,
    the first external interface is configured to receive Y signals;
    the signal receiving module is configured to detect the Y signals received by the first external interface, and to obtain a bit string corresponding to continuous L time intervals in Y−1 time intervals of the Y signals according to a bit string corresponding to a single time interval of the continuous L time intervals in the Y−1 time intervals, wherein in a case of L>1, respective time intervals in the continuous L time intervals are the same, where Y and L are positive integers, and L≤Y−1.

2. The communication device according to claim 1, wherein the second pin is electrically connected to the signal receiving module and configured to receive the Y signals.

3. The communication device according to claim 1, wherein
    the first pin is electrically connected to the signal receiving module, the second pin is connected to a ground end; and
    the first pin is configured to receive the Y signals.

4. The communication device according to claim 1, further comprising:
    a power supply interface connected to a power supply; and
    wherein the signal generation module is connected between the power supply interface and the first pin.

5. The communication device according to claim 4, wherein the signal generation module comprises a main control chip and a signal generation unit, wherein,
    the main control chip is connected to the signal generation unit, and the main control chip is configured to generate X control signals according to the time interval corresponding to the N-bit string to be sent, and to output the X control signals to trigger the signal generation unit to generate the X signals; and
    the signal generation unit is arranged between the power supply interface and the first pin, and the signal generation unit is configured to control a connection between the power supply interface and the first pin to be turned on or off under the control of the X control signals output by the main control chip, and to generate the X signals, wherein the time interval corresponding to the N-bit string to be sent represents time interval between start times of each two adjacent signals, where X≥1, and X is a natural number.

6. The communication device according to claim 1, further comprising:
    a power supply interface connected to a power supply and the first pin.

7. The communication device according to claim 1, wherein the signal generation module comprises a main control chip and a signal generation unit, wherein,
    the main control chip is connected to the signal generation unit, and the main control chip is configured to generate X control signals according to the time interval corresponding to the N-bit string to be sent, and to output the X control signals to trigger the signal generation unit to generate the X signals; and
    the signal generation unit is connected between a ground end and the first pin, and the signal generation unit is configured to control a connection between the ground end and the first pin to be turned on or off under the control of the X control signals output by the main control chip, and to generate the X signals, wherein the time interval corresponding to the N-bit string to be sent represents time interval between start times of each two adjacent signals, where X≥1, and X is a natural number.

8. The communication device according to claim 7, wherein the signal generation unit comprises:
    a first connection end electrically connected to the ground end;
    a second connection end electrically connected to the first pin; and
    a control end connected to the main control chip, and configured to control a connection between the first connection end and the second connection end to be turned on or off according to the X control signals output by the main control chip.

9. The communication device according to claim 7, further comprising:
    a boost reset circuit, wherein the boost reset circuit is electrically connected between the power supply interface and the signal generation unit, electrically connected to the main control chip, and configured to enter a working state or a non-working state under the control of a boost control signal output by the main control chip.

10. The communication device according to claim 9, wherein the boost reset circuit comprises a DC/DC boost component, and the DC/DC boost component comprises:
an input end electrically connected to the power supply interface;
an output end electrically connected to the signal generation unit; and
a control end electrically connected to the main control chip, configured to control the DC/DC boost component to enter a working state or a non-working state according to the boost control signal output by the main control chip.

11. The communication device according to claim 10, wherein the boost reset circuit comprises a filter connected between the ground end and the output end of the DC/DC boost component.

12. The communication device according to claim 11, wherein the boost reset circuit comprises a switcher, wherein the switcher comprises:
a third connection end electrically connected to the ground end;
a fourth connection end electrically connected to the output end; and
a control end electrically connected to the main control chip, and configured to control a connection between the third connection end and the fourth connection end to be turned on or off according to a turning-on/turning-off control signal output by the main control chip.

13. The communication device according claim 1, further comprising a line protection circuit connected in series between a first component and a second component, wherein,
the first component is configured as the signal generation module, and the second component is configured as the first pin; or
the first component is configured as the power supply interface, and the second component is configured as the signal generation module; or
the first component is configured as the power supply interface, and the second component is configured as the first pin; or
the first component is configured as the power supply interface, and the second component is configured as the boost reset circuit; or
the first component is configured as the boost reset circuit, and the second component is configured as the signal generation unit; or
the first component is configured as the ground end, and the second component is configured as the second pin.

14. The communication device according to claim 13, wherein the line protection circuit comprises a control module and a switch module, wherein,
the switch module comprises a fifth connection end, a sixth connection end and a controlled port;
the control module comprises a first detection port, a second detection port and a control port, wherein the first detection port is electrically connected to the fifth connection end of the switch module, the second detection port is electrically connected to the sixth connection end of the switch module, and the control port is electrically connected to the controlled port of the switch module;
the control module is configured to, when the switch module switches on a connection between the fifth connection end and the sixth connection end, detect a first level of the fifth connection end of the switch module via the first detection port, and to detect a second level of the sixth connection end of the switch module via the second detection port, and when a difference between the first level and the second level satisfies a condition to trigger line protection, to output a first control signal to the controlled port of the switch module via the control port, and to control the switch module to switch off the connection between the fifth connection end and the sixth connection end;
wherein the fifth connection end is electrically connected to the first component; or the sixth connection end is electrically connected to the second component.

15. The communication device according to claim 1, further comprising an anti reverse connection module, wherein,
the anti reverse connection module is electrically connected to the first external interface, and electrically connected to an input end of the signal generation module and an input end of the signal receiving module, an output end of the signal generation module and an output end of the signal receiving module are electrically connected to a ground end respectively, the anti reverse connection module is connected to the ground end;
the anti reverse connection module is configured to conduct a first connection between a first connection point and one of the first pin and the second pin, and to conduct a second connection between the ground end and the other one of the first pin and the second pin, wherein the first connection point is a junction where the anti reverse connection module is connected to the input end of the signal generation module and the input end of the signal receiving module.

16. An adapter device, comprising:
a communication device comprising:
a first external interface comprising a first pin and a second pin; and
a signal generation module electrically connected to the first pin, wherein the signal generation module is configured to generate X signals according to time interval corresponding to an N-bit string to be sent, the time interval corresponding to the N-bit string to be sent represents time interval between start times of each two adjacent signals, different bit strings correspond to different time intervals respectively, where N≥1, X≥1, and X is a natural number;
wherein, the first external interface is configured to send the X signals via the first pin;
a second external interface and a codec;
wherein the codec is electrically connected between the second external interface and the signal generation module of the communication device,
the second external interface is configured to receive first data sent from an external terminal electrically connected to the second external interface;
the codec is configured to decode the first data according to a protocol supported by the second external interface to obtain an N-bit string to be sent, and to send the N-bit string to be sent to the signal generation module.

17. The adapter device according to claim 16, further comprising:
a signal receiving module connected to the first external interface of the communication device and the codec;
wherein, the first external interface is configured to receive Y signals;

the signal receiving module is configured to detect the Y signals received by the first external interface, and to obtain a bit string corresponding to continuous L time intervals in Y−1 time intervals of the Y signals according to a bit string corresponding to a single time interval of the continuous L time intervals in the Y−1 time intervals, and to send the bit string corresponding to the continuous L time intervals to the codec, wherein in a case of L>1, respective time intervals in the continuous L time intervals are the same, where Y and L are positive integers, and L≤Y−1;

the codec is configured to receive the bit string corresponding to the continuous L time intervals sent from the signal receiving module, and to encode the bit string corresponding to the continuous L time intervals according to the protocol supported by the second external interface to obtain second data;

the second external interface is configured to send the second data to the external terminal.

\* \* \* \* \*